US012810526B2

(12) United States Patent
Kim et al.

(10) Patent No.: US 12,810,526 B2
(45) Date of Patent: Nov. 24, 2026

(54) ELECTRONIC DEVICE FOR PROVIDING AVATAR BASED ON USER FACE AND OPERATING METHOD THEREOF

(71) Applicant: Samsung Electronics Co., Ltd., Suwon-si (KR)

(72) Inventors: Woojae Kim, Suwon-si (KR); Byeongwook Yoo, Suwon-si (KR); Gunill Lee, Suwon-si (KR); Wonwoo Lee, Suwon-si (KR); Jiwon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 19/033,942

(22) Filed: Jan. 22, 2025

(65) Prior Publication Data

US 2025/0166277 A1 May 22, 2025

Related U.S. Application Data

(63) Continuation of application No. PCT/KR2023/009425, filed on Jul. 4, 2023.

(30) Foreign Application Priority Data

Aug. 29, 2022 (KR) ........................ 10-2022-0108717

(51) Int. Cl.
*G06T 15/04* (2011.01)
*G06T 5/70* (2024.01)
*G06T 7/90* (2017.01)

(52) U.S. Cl.
CPC ................ *G06T 15/04* (2013.01); *G06T 5/70* (2024.01); *G06T 7/90* (2017.01)

(58) Field of Classification Search
None
See application file for complete search history.

(56) References Cited

U.S. PATENT DOCUMENTS 9,007,480 B2 4/2015 Ciuc et al.
9,508,197 B2 11/2016 Quinn et al.
(Continued)

FOREIGN PATENT DOCUMENTS

CN 106570822 A 4/2017
CN 112669447 A 4/2021
(Continued)

OTHER PUBLICATIONS

International Search Report dated Oct. 12, 2023, issued in International Application No. PCT/KR2023/009425.
(Continued)

*Primary Examiner* — Saptarshi Mazumder
(74) *Attorney, Agent, or Firm* — Jefferson IP Law, LLP

(57) ABSTRACT

An electronic device for providing an avatar is provided. The electronic device includes memory storing one or more computer programs, and one or more processors communicatively coupled to the memory, wherein the one or more computer programs include computer-executable instructions that, when executed by the one or more processors individually or collectively, cause the electronic device to obtain a plurality of raw textures by matching a three-dimensional (3D) shape related to a user face to a two-dimensional (2D) plane, perform tone-matching for smoothing each of skin tones of the plurality of raw textures based on an average of the skin tones of the plurality of raw textures, obtain a plurality of texture segments by splitting at least one of a plurality of tone-matched raw textures for each feature area in a face, obtain a combined texture by combining a plurality of texture segments selected by a user input from among the obtained plurality of texture segments, (Continued)

and obtain an avatar representing the user face in a 3D shape based on the combined texture.

19 Claims, 14 Drawing Sheets

(56) References Cited

U.S. PATENT DOCUMENTS

| | | | |
|---|---|---|---|
| 9,576,400 | B2 | 2/2017 | Van Os et al. |
| 9,693,049 | B2 * | 6/2017 | Priede ........................ G06T 1/60 |
| 10,043,278 | B2 | 8/2018 | Kim et al. |
| 10,789,784 | B2 | 9/2020 | Lin et al. |
| 10,872,457 | B1 * | 12/2020 | Hu .......................... G06T 15/04 |
| 10,915,744 | B2 | 2/2021 | Park et al. |
| 10,945,813 | B2 * | 3/2021 | Li .......................... G16H 50/50 |
| 2010/0208813 | A1 * | 8/2010 | Murakami ........... H04N 19/132 375/E7.246 |
| 2013/0218531 | A1 * | 8/2013 | Deichmann ........ A61C 13/0004 703/1 |
| 2015/0190716 | A1 | 7/2015 | Evertt et al. |
| 2016/0070952 | A1 | 3/2016 | Kim et al. |
| 2019/0035149 | A1 * | 1/2019 | Chen .................... G06V 40/166 |
| 2023/0245367 | A1 * | 8/2023 | Shin ........................ G06T 11/10 345/473 |

FOREIGN PATENT DOCUMENTS

| | | | |
|---|---|---|---|
| CN | 113538655 | A | 10/2021 |
| CN | 108171789 | B | 1/2022 |
| CN | 114663570 | A | 6/2022 |
| KR | 10-2016-0029629 | A | 3/2016 |
| KR | 10-1896137 | B1 | 9/2018 |
| KR | 10-2019-0069750 | A | 6/2019 |
| KR | 10-2020-0044198 | A | 4/2020 |
| KR | 10-2020-0045759 | A | 5/2020 |
| KR | 10-2135770 | B1 | 7/2020 |

OTHER PUBLICATIONS

Wenyan et al.; High-Resolution Image Harmonization via Collaborative Dual Transformations, Mar. 24, 2022.

https://en.wikipedia.org/wiki/Histogram_matching, Nov. 26, 2010.

Lin et al.; Melngame: Create a game character face from a single portrait, Feb. 7, 2021.

Yao et al.; Learning an animatable detailed 3D face model from in-the-wild images, vol. 40, No. 4, Article 88, Aug. 2021.

Radek et al.; EMOCA: Emotion Driven Monocular Face Capture and Animation (2021), Max Planck Institute for Intelligent Systems, Tubingen, Germany.

* cited by examiner

ELECTRONIC DEVICE FOR PROVIDING AVATAR BASED ON USER FACE AND OPERATING METHOD THEREOF

CROSS-REFERENCE TO RELATED APPLICATION(S)

This application is a continuation application, claiming priority under 35 U.S.C. § 365(c), of an International application No. PCT/KR2023/009425, filed on Jul. 4, 2023, which is based on and claims the benefit of a Korean patent application number 10-2022-0108717, filed on Aug. 29, 2022, in the Korean Intellectual Property Office, the disclosure of which is incorporated by reference herein in its entirety.

BACKGROUND

1. Field

The disclosure relates to an electronic device for providing an avatar based on a user face and an operating method thereof. More particularly, the disclosure relates to an electronic device for providing an avatar by combining segments of several areas of a user face based on various images of the user face to provide a natural avatar by smoothing colors of the segments, and an operating method of the electronic device.

2. Description of Related Art

An avatar is a virtual graphic object that represents a user in the real world, such as a two-dimensional (2D) icon or a three-dimensional (3D) model. An avatar may be as simple as a user's photo, or may be a graphic object that may represent the user's appearance, facial expression, activity, interest, or personality. An avatar may also be viewed as an animation.

Avatars are widely used in games, social network services (SNSs), messenger application services, health applications, or exercise applications. In a game or social network service, an avatar may be created and changed according to the purpose of a service provided by an application. In a game or social network service, an avatar may have an appearance unrelated to a user's appearance, posture, or facial expression, or an avatar may be similar to the user but may be provided with a function that allows the user to change the avatar's appearance as desired. For example, a game or social network service provides a function for customizing an avatar's clothes, accessories, items, and the like.

Providing an avatar that reflects various external characteristics of a user's face for the use of metaverse and augmented reality (AR) services may satisfy the user's taste or may be a means of expressing the user's personality. Also, in order to provide a user with an experience similar to reality, there is a need for an avatar that may represent a user's face more naturally and may freely represent facial textures such as the user's facial makeup that changes daily.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for providing an avatar based on a user face and an operating method thereof.

Additional aspects will be set forth in part in the description which follows and, in part, will be apparent from the description, or may be learned by practice of the presented embodiments.

In accordance with an aspect of the disclosure, an electronic device for providing an avatar is provided. The electronic device includes at memory storing one or more computer programs, and one or more processors communicatively coupled to the memory, wherein the one or more computer programs include computer-executable instructions that, when executed by the one or more processors individually or collectively, cause the electronic device to obtain a plurality of raw textures by matching a three-dimensional (3D) shape related to a user face to a two-dimensional (2D) plane, perform tone-matching for smoothing each of skin tones of the plurality of raw textures based on an average of the skin tones of the plurality of raw textures, obtain a plurality of texture segments by splitting at least one of a plurality of tone-matched raw textures for each feature area in the face, obtain a combined texture by combining a plurality of texture segments selected for each specific area by a user input from among the obtained plurality of texture segments, and obtain the avatar representing the user face in a 3D shape, by mapping the combined texture.

In accordance with another aspect of the disclosure, a method performed by an electronic device of providing an avatar is provided. The method includes obtaining, the electronic device, a plurality of raw textures by matching a three-dimensional (3D) shape related to a user face to a two-dimensional (2D) plane, performing, the electronic device, tone-matching for smoothing each of skin tones of the plurality of raw textures based on an average of the skin tones of the plurality of raw textures, obtaining, the electronic device, a plurality of texture segments by splitting at least one of a plurality of tone-matched raw textures for each feature area in the face, obtaining, the electronic device, a combined texture by combining a plurality of texture segments selected for each specific area by a user input from among the obtained plurality of texture segments, and obtaining, the electronic device, the avatar representing the user face in a 3D shape, by mapping the combined texture.

In accordance with another aspect of the disclosure, one or more non-transitory computer-readable recording media storing one or more computer programs including computer-executable instructions that, when executed by one or more processors of an electronic device individually or collectively, cause the electronic device to perform operations. The operations include obtaining, the electronic device, a plurality of raw textures by matching a three-dimensional (3D) shape related to a user face to a two-dimensional (2D) plane, performing, the electronic device, tone-matching for smoothing each of skin tones of the plurality of raw textures based on an average of the skin tones of the plurality of raw textures, obtaining, the electronic device, a plurality of texture segments by splitting at least one of a plurality of tone-matched raw textures for each feature area in a face, obtaining, the electronic device, a combined texture by combining a plurality of texture segments selected for each specific area by a user input from among the obtained plurality of texture segments, and obtaining, the electronic device, an avatar representing the user face in a 3D shape, by mapping the combined texture.

In accordance with another aspect of the disclosure, one or more non-transitory computer-readable recording medium having recorded thereon a program for execution on a computer is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
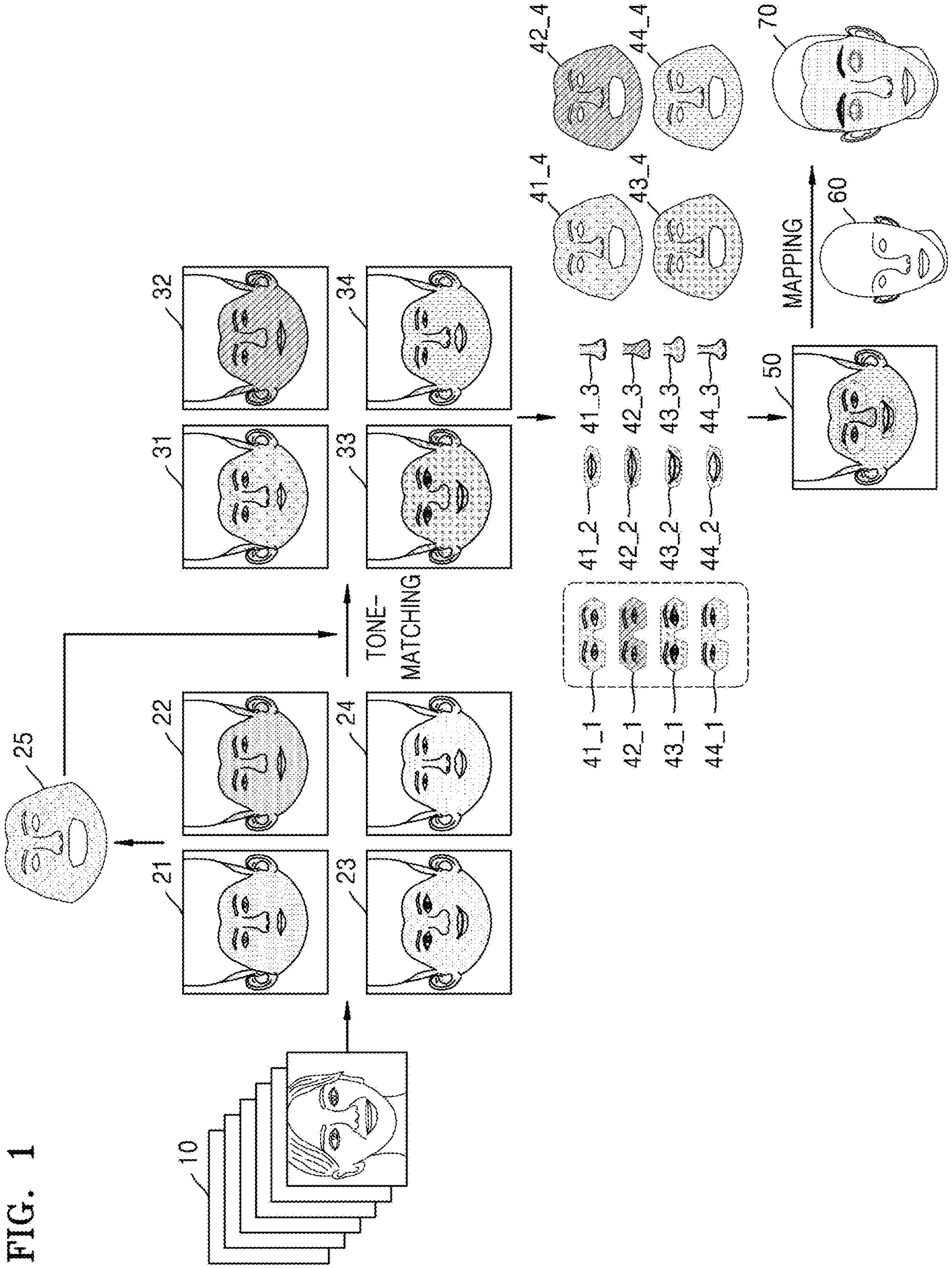
FIG. 1 is a conceptual diagram illustrating an operation in which an electronic device provides an avatar based on a user face, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include the plural referents unless the context clearly dictates otherwise. Thus, for example, reference to "a component surface" includes reference to one or more of such surfaces.

When a portion "includes" an element, another element may be further included, rather than excluding the existence of the other element, unless otherwise described. Also, the term " . . . unit" or " . . . module" refers to a unit that performs at least one function or operation, and may be implemented as hardware or software or as a combination of hardware and software.

The expression "configured (or set) to" used in the disclosure may be replaced with, for example, "suitable for," "having the capacity to," "designed to," "adapted to," "made to," or "capable of" according to a situation. The term "configured (or set) to" does not always mean only "specifically designed to" by hardware. Alternatively, in some situations, the expression "system configured to" may mean that the system is "capable of" operating together with another device or component. For example, "a processor configured (or set) to perform A, B, and C" may be a dedicated processor (e.g., an embedded processor) for performing a corresponding operation or a generic-purpose processor (e.g., a central processing unit (CPU) or an application processor) that may perform a corresponding operation by executing at least one software program stored in memory.

Also, in the specification, it will be understood that when elements are "connected" or "coupled" to each other, the elements may be directly connected or coupled to each other, but may alternatively be connected or coupled to each other with an intervening element therebetween, unless specified otherwise.

The term "avatar" used herein is a virtual graphic object that represents a user in the real world, such as a two-dimensional (2D) or three-dimensional (3D) icon, character, or model. In an embodiment of the disclosure, an avatar may be as simple as a user's photo, or may be a graphic object that may represent the user's appearance, facial expression, activity, interest, or personality. An avatar may be provided, for example, through a game, a social network service (SNS), a messenger application service, a health application, or an exercise application.

An embodiment of the disclosure will now be described more fully with reference to the accompanying drawings for one of ordinary skill in the art to be able to perform the embodiment of the disclosure without any difficulty. However, the disclosure may be embodied in many different forms and is not limited to the embodiments of the disclosure set forth herein.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a conceptual diagram illustrating an operation in which an electronic device provides an avatar based on a user face, according to an embodiment of the disclosure.

Referring to FIG. 1, an electronic device may obtain a face image 10 including a user face. In an embodiment, the face image 10 may include one or more images.

The face image 10 may be an image obtained by photographing a specific user's face. The face image 10 may be an image obtained by photographing the front of a user face including two eyes, a nose, and a mouth.

The face image 10 may be an image obtained by photographing the same user's face in various environments. For example, the face image 10 includes an image of the face of a first user captured in the morning and an image of the face of the first user captured at night. Because the amount of light received by the face of the first user varies according to time, a skin color of the face of the first user photographed in the morning and a skin color of the face of the first user photographed at night may be different from each other.

In another example, the face image 10 may include an image of the face of the first user before makeup and an image of the face of the first user after makeup. A skin tone of the face of the first user may vary according to whether makeup is applied. Also, a skin tone of the face of the first user may vary according to a difference in a makeup method.

In FIG. 1, the face images 10 including the user's face may be flat images obtained by photographing a 3D shape related to the user's face.

In an embodiment, the electronic device may obtain a plurality of raw textures (e.g., 21, 22, 23, and 24) based on the face image 10. In an embodiment, the electronic device may obtain the plurality of raw textures (e.g., 21, 22, 23, and 24) based on the 3D shape obtained from the face image 10.

The plurality of raw textures (e.g., 21, 22, 23, and 24) may be images obtained by matching the user face to a 2D plane based on the face image 10. The plurality of raw textures (e.g., 21, 22, 23, and 24) may be images obtained by matching the 3D shape related to the user face in the face image 10 to a 2D plane. For example, the electronic device obtains a 2D image by unwrapping the 3D shape related to the user face in the face image 10 on a 2D plane, by using an ultraviolet (UV) unwrapping method. However, a method of obtaining a 2D image based on a 3D image is only an example, and the technical idea of the disclosure is not limited thereto.

Each raw texture may be obtained corresponding to the face image 10. That is, the number of obtained raw textures may be determined according to the number of obtained face images 10. Although four raw textures are obtained in FIG. 1, this is only for convenience, and the technical idea of the disclosure is not limited thereto.

Because a sample area of skin smoothing increases as the number of raw textures increases, the electronic device according to an embodiment of the disclosure may perform smoothing with a more average skin tone by using a large number of raw textures. However, because the number of obtained raw textures may be determined according to a user's intention, the technical idea of the disclosure is not limited thereto. In an embodiment, an average skin tone of the method may be defined as an average skin tone of raw textures or an average skin tone of raw textures arbitrarily selected from among the raw textures. That is, the electronic device according to an embodiment of the disclosure may perform smoothing with an average skin tone by using raw textures arbitrarily selected by a user from among raw textures.

The electronic device for providing an avatar according to an embodiment of the disclosure may obtain the plurality of raw textures (e.g., 21, 22, 23, and 24), a plurality of tone-matching textures (e.g., 31, 32, 33, and 34), and a combined texture 50. Each of the plurality of raw textures (e.g., 21, 22, 23, and 24), the plurality of tone-matching textures (e.g., 31, 32, 33, and 34), and the combined texture 50 may include a skin tone segment, an eye segment, a nose segment, and a mouth segment. For example, a first tone-matching texture 31 from among the plurality of tone-matching textures includes a first tone-matching skin tone segment 41_4, a first tone-matching eye segment 41_1, a first tone-matching nose segment 41_2, and a first tone-matching mouth segment 41_3. A reference area for splitting each texture into segments will be described with reference to FIG. 5.

A skin tone segment may include information about a skin tone included in a corresponding face image. The disclosure, a skin tone may refer to a color of the skin. In detail, a skin tone may be a concept including at least one of a color, saturation, and brightness of the skin.

An eye segment may include data about the shape of a user's eyes, such as shape, length, and depth, obtained from a corresponding face image. Also, the eye segment may include information about a skin tone around the user's eyes. Also, the eye segment may include data about the shape of the user's eyebrows, such as shape, length, and color, obtained from the corresponding face image.

A nose segment may include data about the shape of a user's nose, such as shape, length, and height, obtained from a corresponding face image. Also, the nose segment may include information about a skin tone around the user's nose.

A mouth segment may include data about the shape of a user's mouth, such as length, color, and thickness, obtained from a corresponding face image. Also, the mouth segment may include information about a skin tone around the user's mouth.

A raw eye segment, a raw nose segment, and a raw mouth segment may be obtained from the face image 10 photographed in various ways according to the user's daily makeup method. The electronic device may obtain an avatar 70 that more specifically reflects the user's appearance, by smoothing a skin tone based on the plurality of raw textures (e.g., 21, 22, 23, and 24) corresponding to the face image 10.

In an embodiment, the electronic device may obtain an average skin tone segment 25. The average skin tone segment 25 may be obtained based on the plurality of raw textures (e.g., 21, 22, 23, and 24).

In detail, the electronic device may obtain a plurality of raw skin tone segments respectively corresponding to the plurality of raw textures (e.g., 21, 22, 23, and 24). A skin tone segment may include information about a skin tone included in a corresponding raw texture. The plurality of raw textures may include a first raw texture 21, a second raw texture 22, a third raw texture 23, and a fourth raw texture 24. The electronic device may obtain a first raw skin tone segment corresponding to a first raw texture from the first raw texture 21. The electronic device may obtain a second raw skin tone segment corresponding to a second raw texture from the second raw texture 22. The electronic device may obtain a third raw skin tone segment corresponding to a third raw texture from the third raw texture 23. The electronic device may obtain a fourth raw skin tone segment corresponding to a fourth raw texture from the fourth raw texture 24.

The first raw skin tone segment to the fourth raw skin tone segment may include information about different skin tones. For example, a color of the first raw skin tone segment may be different from a color of the second raw skin tone segment. In another example, a brightness of the second raw skin tone segment may be different from a brightness of the fourth raw skin tone segment. In another example, a saturation of the third raw skin tone segment may be different from a saturation of the fourth raw skin tone segment.

The electronic device may obtain the average skin tone segment 25, based on the first raw skin tone segment to the fourth raw skin tone segment. The average skin tone segment 25 may include information about at least one of an average color, an average saturation, and an average brightness of the first raw skin tone segment to the fourth raw skin tone segment. Although the average skin tone segment 25 is obtained based on the first raw skin tone segment to the fourth raw skin tone segment, this is only an example, and the number of samples for obtaining the average skin tone segment 25 does not limit the technical idea of the disclosure. For example, the electronic device obtains the average skin tone segment 25 based on a first raw skin tone segment to a $10^{th}$ raw skin tone segment.

The electronic device may perform tone-matching for smoothing skin tones of the plurality of raw textures (e.g., 21, 22, 23, and 24) based on the average skin tone segment 25. The electronic device may obtain the plurality of tone-matching textures (e.g., 31, 32, 33, and 34) based on the average skin tone segment 25. The plurality of tone-matching textures (e.g., 31, 32, 33, and 34) may be images respectively obtained by smoothing the plurality of raw textures (e.g., 21, 22, 23, and 24), based on the average skin tone segment 25.

The plurality of tone-matching textures may include a first tone-matching texture 31, a second tone-matching texture 32, a third tone-matching texture 33, and a fourth tone-matching texture 34.

For example, the electronic device obtains the first tone-matching texture 31, by smoothing the first raw texture 21 based on the average skin tone segment 25. The electronic device may obtain the second tone-matching texture 32, by smoothing the second raw texture 22 based on the average skin tone segment 25. The electronic device may obtain the third tone-matching texture 33, by smoothing the third raw texture 23 based on the average skin tone segment 25. The electronic device may obtain the fourth tone-matching texture 34, by smoothing the fourth raw texture 24 based on the average skin tone segment 25. Although a method of obtaining the first tone-matching texture 31 is described in detail based on the first raw texture 21 and the first tone-matching texture 31 for convenience of explanation, a method of obtaining the second to fourth tone-matching textures 32, 33, and 34 may also be the same.

The average skin tone segment 25 and the first raw skin tone segment included in the first raw texture 21 may be different from each other. For example, a color of the average skin tone segment 25 and a color of the first raw skin tone segment included in the first raw texture 21 may be different from each other. In another example, a saturation of the average skin tone segment 25 may be different from a saturation of the first raw skin tone segment.

The electronic device may smooth the first raw skin tone segment included in the first raw texture 21 based on the average skin tone segment 25. For example, the electronic device changes the first raw skin tone segment to be closer to a skin tone according to the average skin tone segment 25. That is, the electronic device may obtain a first tone-matching skin tone segment having a skin tone closer to the average skin tone segment 25 than the first raw skin tone segment. The first tone-matching skin tone segment may be a skin tone segment included in the first tone-matching texture 31.

In the disclosure, when a skin tone or a skin tone segment is smoothed, it may mean that at least one of colors, saturations, and brightness of skin tones included in the plurality of raw textures (e.g., 21, 22, 23, and 24) is harmonized so that a plurality of skin tones included in the plurality of raw textures (e.g., 21, 22, 23, and 24) have similar skin tones.

A method of smoothing a skin tone does not limit the technical idea of the disclosure. For example, the electronic device obtains a plurality of tone-matching skin tone segments from skin tone segments included in the plurality of raw textures (e.g., 21, 22, 23, and 24), through a method of smoothing a skin tone by using a histogram matching method.

In an embodiment, the electronic device may obtain the first tone-matching texture 31 based on the obtained first tone-matching skin tone segment.

In an embodiment, the electronic device may obtain a plurality of texture segments by splitting the first tone-matching texture 31 for each feature area.

In the disclosure, each texture segment may refer to a body part piece image included in one of a raw texture, a tone-matching texture, and a combined texture. A texture segment may include a skin tone segment, an eye segment, a nose segment, and a mouth segment. For example, a texture segment is a piece image of the shape of a user's nose, that is, a nose segment.

A skin tone included in the first tone-matching texture 31 may be different from a skin tone included in the first raw texture 21. That is, the first tone-matching skin tone segment may be data obtained by smoothing the first raw skin tone segment based on the average skin tone segment 25.

A shape of eyes included in the first tone-matching texture 31 may be the same as a shape of eyes included in the first raw texture 21. A shape of a nose included in the first tone-matching texture 31 may be the same as a shape of a nose included in the first raw texture 21. A shape of a mouth included in the first tone-matching texture 31 may be the same as a shape of a mouth included in the first raw texture 21. The first tone-matching texture 31 may have a skin tone according to the first tone-matching skin tone segment obtained by tone-matching the first raw skin tone segment. That is, the first tone-matching texture 31 may include texture segments that are different in a skin tone from the first tone texture 21 but are the same in the shapes of eyes, nose, and mouth.

Although the first raw texture 21 and the first tone-matching texture 31 are mainly described for convenience of explanation, the description of the second to fourth tone-matching textures 32, 32*a*, 33, 33*a*, 34 and 34*a* is also the same.

In an embodiment, the electronic device may include a segment database in which a plurality of texture segments (e.g., 41_1 to 41_4, 42_1 to 42_4, 43_1 to 43_4, and 44_1 to 44_4) are stored for each feature area.

The segment database may include a skin tone segment database, an eye segment database, a nose segment database, and a mouth segment database.

The electronic device may store a plurality of tone-matching skin tone segments in the skin tone segment database. For example, as shown in FIG. 1, the electronic device includes first to fourth tone-matching skin tone segments 41_4, 42_4, 43_4, and 44_4 in the skin tone segment database.

The electronic device may store a plurality of tone-matching eye segments in the eye segment database. For example, as shown in FIG. 1, the electronic device stores first to fourth tone-matching eye segments 41_1, 42_1, 43_1, and 44_1 in the eye segment database.

The electronic device may store a plurality of tone-matching nose segments in the nose segment database. For example, as shown in FIG. 1, the electronic device stores first to fourth tone-matching nose segments 41_3, 42_3, 43_3, and 44_3 in the nose segment database.

The electronic device may store a plurality of tone-matching mouth segments in the mouth segment database. For example, as shown in FIG. 1, the electronic device stores first to fourth tone-matching mouth segments 41_2, 42_2, 43_2, and 44_2 in the mouth segment database.

In an embodiment, the electronic device may obtain the combined texture 50 by combining the texture segments (e.g., 41_1 to 41_4, 42_1 to 42_4, 43_1 to 43_4, and 44_1 to 44_4) stored in the segment database. The electronic device may obtain the combined texture 50, by combing a plurality of texture segments selected one by one for each feature area by a user input.

In detail, the electronic device may obtain a plurality of texture segments selected one by one for a skin area, an eye area, a nose area, and a mouth area by a user input.

For example, the electronic device receives a user input that selects the fourth tone-matching skin tone segment 44_4 from the segment database, and obtains the fourth tone-matching skin tone segment 44_4 based on the received user input. The electronic device may receive a user input that selects the first tone-matching eye segment 41_1 from the segment database, and may obtain the first tone-matching eye segment 41_1 based on the received user input. The electronic device may receive a user input that selects the second tone-matching nose segment 42_3 from the segment database, and may obtain the second tone-matching nose segment 42_3 based on the received user input. The electronic device may receive a user input that selects the third tone-matching mouth segment 43_2 from the segment database, and may obtain the third tone-matching mouth segment 43_2 based on the received user input.

The electronic device may obtain the combined texture 50 by combining the fourth tone-matching skin tone segment 44_4, the first tone-matching eye segment 41_1, the second tone-matching nose segment 42_3, and the third tone-matching mouth segment 43_2.

The fourth tone-matching skin tone segment 44_4 included in the combined texture 50 may include information about a skin tone included in the fourth tone-matching texture 34. The first tone-matching eye segment 41_1 included in the combined texture 50 may include information about a skin tone included in the first tone-matching texture 31. The second tone-matching nose segment 42_3 included in the combined texture 50 may include information about a skin tone included in the second tone-matching texture 32. The third tone-matching mouth segment 43_2 included in the combined texture 50 may include information about a skin tone included in the third tone-matching texture 33.

Because each of the first to fourth tone-matching skin tone segments 41_4 to 44_4 is obtained by tone-matching a skin tone based on the average skin tone segment 25, the combined texture 50 may have a skin tone that is more naturally connected even though combined from various face images.

In an embodiment, the electronic device may obtain a 3D mesh 60 related to the user's face. The 3D mesh 60 may refer to a 3D shape related to the user's facial skeleton.

The electronic device may obtain the avatar 70 by mapping the combined texture 50 to the 3D mesh 60. The electronic device may obtain the avatar 70 by using, a UV mapping method, that is, a method of projecting the combined texture 50, which is a 2D image, onto a surface of the 3D mesh 60. A method of obtaining the avatar 70 of the disclosure is not limited to the UV mapping method.

Figure 2:
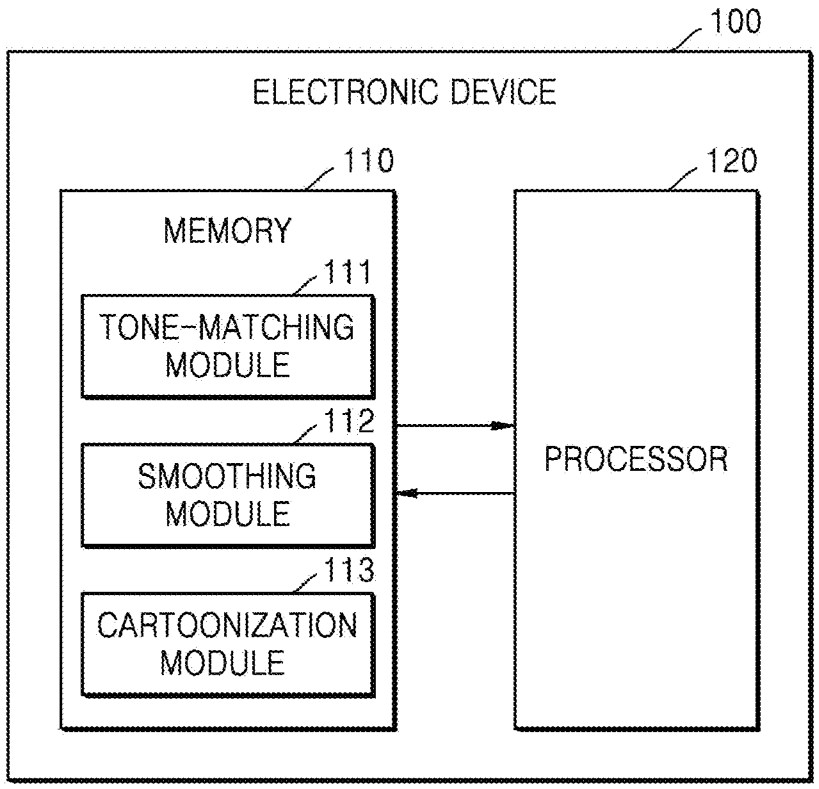
FIG. 2 is a block diagram illustrating elements of an electronic device, according to an embodiment of the disclosure.

FIG. 2 is a block diagram illustrating elements of an electronic device, according to an embodiment of the disclosure.

Referring to FIG. 2, an electronic device 100 according to an embodiment of the disclosure is a device for providing an avatar service to a user, and includes, for example, a smartphone, a tablet PC, or an augmented reality device. However, the disclosure is not limited thereto, and the electronic device 100 may be implemented as any of various devices such as a laptop computer, a desktop PC, an electronic book reader, a digital broadcasting terminal, a personal digital assistant (PDA), a portable multimedia player (PMP), a navigation device, an MP3 player, a camcorder, an Internet protocol television (IPTV), a digital television (DTV), or a wearable device (e.g., a smart watch).

The electronic device 100 may include memory 110 and a processor 120. The processor 120 and the memory 110 may be electrically and/or physically connected to each other.

Elements shown in FIG. 2 are only an embodiment of the disclosure, and elements of the electronic device 100 are not limited to those shown in FIG. 2. The electronic device 100 may not include some of the elements shown in FIG. 2, or may further include elements not shown in FIG. 2.

In an embodiment of the disclosure, the electronic device 100 may further include a communication interface configured to perform data communication with an external device or a server. The communication interface may include at least one hardware module from among, for example, a Wi-Fi communication module, a Wi-Fi direct (WFD) communication module, a Bluetooth communication module, a Bluetooth low energy (BLE) communication module, a near-field communication (NFC) unit, a Zigbee communication module, an Ant+communication module, a micro-wave (μWave) communication module, or a mobile communication module (e.g., third generation (3G), fourth generation (4G) long term evolution (LTE), fifth generation (5G) mmWave, or 5G negative resistance (NR)).

In an embodiment of the disclosure, the electronic device 100 may further include an input interface through which a user input is received. The input interface may include, for example, a keyboard, a mouse, a touchscreen, or a voice input device (e.g., a microphone), and may include any other input device known to one of ordinary skill in the art.

In an embodiment of the disclosure, the electronic device 100 may be configured as a portable device, and may further include a camera, a processor, a display unit, and a battery for supplying driving power to the display unit.

The camera may be configured to obtain an image by photographing a real space or a user. The camera may include a lens module, an image sensor, and an image processing module. The camera may obtain a still image or a moving image by using the image sensor (e.g., a complementary metal oxide semiconductor (CMOS) or a charge-coupled device (CCD)). The image processing module may process the still image or the moving image obtained by the image sensor, may extract necessary information, and may transmit the extracted information to the processor 120. In an embodiment of the disclosure, the camera may photograph the user and may provide information about the user's facial skin tone and each body part of the user's face to the processor 120.

The processor 120 may execute one or more instructions of a program stored in the memory 110. The processor 120 may include a hardware component for performing arithmetic, logic, and input/output operations and signal processing. For example, the processor 120 includes at least one of, but not limited to, a central processing unit, a microprocessor, a graphics processing unit, an application-specific integrated circuit (ASIC), a digital signal processor (DSP), a digital signal processing device (DSPD), a programmable logic device (PLD), and a field-programmable gate array (FPGA).

Although the processor 120 is one element in FIG. 2, the disclosure is not limited thereto. In an embodiment, one or more processors 120 may be provided.

In an embodiment of the disclosure, the processor 120 may include an artificial intelligence (AI) processor that performs AI learning. In this case, the AI processor may obtain an avatar in which a skin tone is smoothed by using a trained network model of an AI system. The AI processor may be manufactured as a dedicated hardware chip for AI, or may be manufactured as a part of an existing general-purpose processor (e.g., a CPU or an application processor) or a dedicated graphics processor (e.g., a GPU) and mounted on the processor 130 in the electronic device 100.

The electronic device 100 for providing an avatar according to an embodiment of the disclosure may include the memory 110 and at least one processor 120. The memory 110 may store at least one instruction. The at least one processor 120 may execute the at least one instruction. The at least one processor 120 may obtain a plurality of raw textures by matching a 3D shape related to a user face to a 2D plane.

The at least one processor 120 may obtain a 2D image of the user face. The at least one processor 120 may obtain a cartoon image by cartoonizing the 2D image. The at least one processor 120 may obtain a 3D stereoscopic image corresponding to the user face, based on the obtained cartoon image. The at least one processor 120 may obtain a plurality of raw textures corresponding to the user face, by unwrapping the 3D stereoscopic image to a 2D plane.

The at least one processor 120 may receive the 2D image and convert the 2D image into the cartoon image, by executing instructions or program code related to a cartoonization module 113. The term "cartoon image" used herein refers to an image obtained by characterizing features of the user face.

The 2D image may be an image of the front of the user face including two eyes, a nose, and a mouth.

The at least one processor 120 may perform tone-matching for smoothing each of skin tones of the plurality of raw textures based on an average of the skin tones of the plurality of raw textures.

The at least one processor 120 may obtain an average skin tone segment based on the skin tones of the plurality of raw textures. The at least one processor 120 may obtain first frequency information about frequencies of colors included in the average skin tone segment. The at least one processor 120 may obtain second frequency information about frequencies of skin tone colors included in the plurality of raw textures. The at least one processor 120 may perform tone-matching based on the first frequency information and the second frequency information.

The at least one processor 120 may obtain the average of the skin tones of the plurality of raw textures, and obtain a plurality of tone-matching textures by tone-matching the skin tones of the plurality of raw textures to be closer to the average of the skin tones of the plurality of raw textures, by executing instructions or program code related to a tone-matching module 111. The "tone-matching" step (or operation) is an operation of changing the skin tones of the plurality of raw textures so that the plurality of raw textures expressing different skin tones have more similar skin tones. The at least one processor 120 obtains the plurality of tone-matching textures by executing the instructions or the program code related to the tone-matching module 111.

The at least one processor 120 may tone-match the plurality of raw textures by using a histogram matching algorithm, based on the average skin tone segment.

The at least one processor 120 may obtain a plurality of texture segments by splitting at least one of a plurality of tone-matched raw textures for each feature area in the face. The at least one processor 120 may obtain a combined texture by combining a plurality of texture segments selected for each specific area by a user input from among the obtained plurality of texture segments.

The memory 110 may include a segment database in which the plurality of texture segments are stored for each feature area. The at least one processor 120 may store the texture segments in a segment database for each feature area. The at least one processor 120 may obtain a combined texture by combining a plurality of texture segments selected one by one for each feature area by a user input.

The feature area may include at least one of a skin area, an eye area, a nose area, and a mouth area of the user face.

The plurality of texture segments may include a plurality of first texture segments related to a first user face and a plurality of second texture segments related to a second user face. The at least one processor 120 may obtain a combined texture, by combining at least one first text segment from among the plurality of first texture segments and at least one second texture segment from among the plurality of second texture segments, selected by a user input.

The at least one processor 120 may obtain an avatar representing the user face in a 3D shape by mapping the combined texture.

The at least one processor 120 may obtain a smoothing texture by smoothing a skin tone between two adjacent texture segments from among the plurality of texture segments in the combined texture.

The at least one processor 120 may smooth a boundary between two adjacent texture segments in the combined texture. The at least one processor 120 may harmonize a skin tone between two adjacent texture segments in the combined texture.

The at least one processor 120 may obtain the smoothing texture by smoothing a skin tone between two adjacent texture segments from among the plurality of texture segments in the combined texture, by executing instructions or program code related to a smoothing module 112. The "smoothing" step (or operation) is an operation of smoothing a boundary between adjacent texture segments in the combined texture. In an embodiment, the "smoothing" step (or operation) may include an operation of smoothing a boundary between adjacent texture segments in the combined texture and an operation of harmonizing colors of two adjacent texture segments with the smoothed boundary therebetween to be similar to each other. The at least one processor 120 may obtain a plurality of smoothing textures by executing instructions or program code related to the tone-matching module 111.

The at least one processor 120 may obtain the avatar representing the user face in a 3D shape based on the smoothing texture.

The at least one processor 120 may obtain a 3D mesh related to a facial skeleton. The at least one processor 120 may obtain the avatar by mapping the combined texture to the 3D mesh.

The memory 110 may include at least one type of storage medium of flash memory type storage medium, a hard disk type storage medium, a multimedia card micro type storage medium, card type memory (e.g., an SD or XD memory), random-access memory (RAM), static random-access memory (SRAM), read-only memory (ROM), electrically erasable programmable read-only memory (EEPROM), programmable read-only memory (PROM), or an optical disk. In an embodiment of the disclosure, the memory 110 may be implemented as a web storage or a cloud server that is accessible through a network and performs a storage function. In this case, the electronic device 100 may communicate with the web storage or the cloud server through a communication interface, and may perform data transmission and reception.

Instructions or program for performing an operation in which the electronic device 100 obtains an avatar representing a user face in a 3D shape may be stored in the memory 110. In an embodiment of the disclosure, at least one of instructions, an algorithm, a data structure, program code, and an application program readably by the processor 120 may be stored in the memory 110. The instructions, the algorithm, the data structure, and the program code stored in the memory 110 may be implemented in a programming or scripting language such as C, C++, Java, or assembler.

The memory 110 may include a segment database in which a plurality of texture segments are stored for each feature area. Instructions, an algorithm, a data structure, or program code related to the tone-matching module 111, the smoothing module 112, and the cartoonization module 113 may be stored in the memory 110. A "module" included in the memory 110 refers to a unit that processes a function or an operation performed by the processor 120, and may be implemented as software such as instructions, an algorithm, a data structure, or program code.

The tone-matching module 111 includes instructions or program code related to a function and/or operation of performing tone-matching for smoothing each of skin tones of a plurality of raw textures based on an average skin tone of the plurality of raw textures. The smoothing module 112 includes instructions or program code related to a function and/or operation of smoothing a skin tone between adjacent texture segments in a combined texture. The cartoonization module 113 includes instructions or program code related to a function and/or operation of cartoonizing the face image 10.

The following embodiments may be implemented when the processor 120 executes instructions or program code stored in the memory 110.

Figure 3:
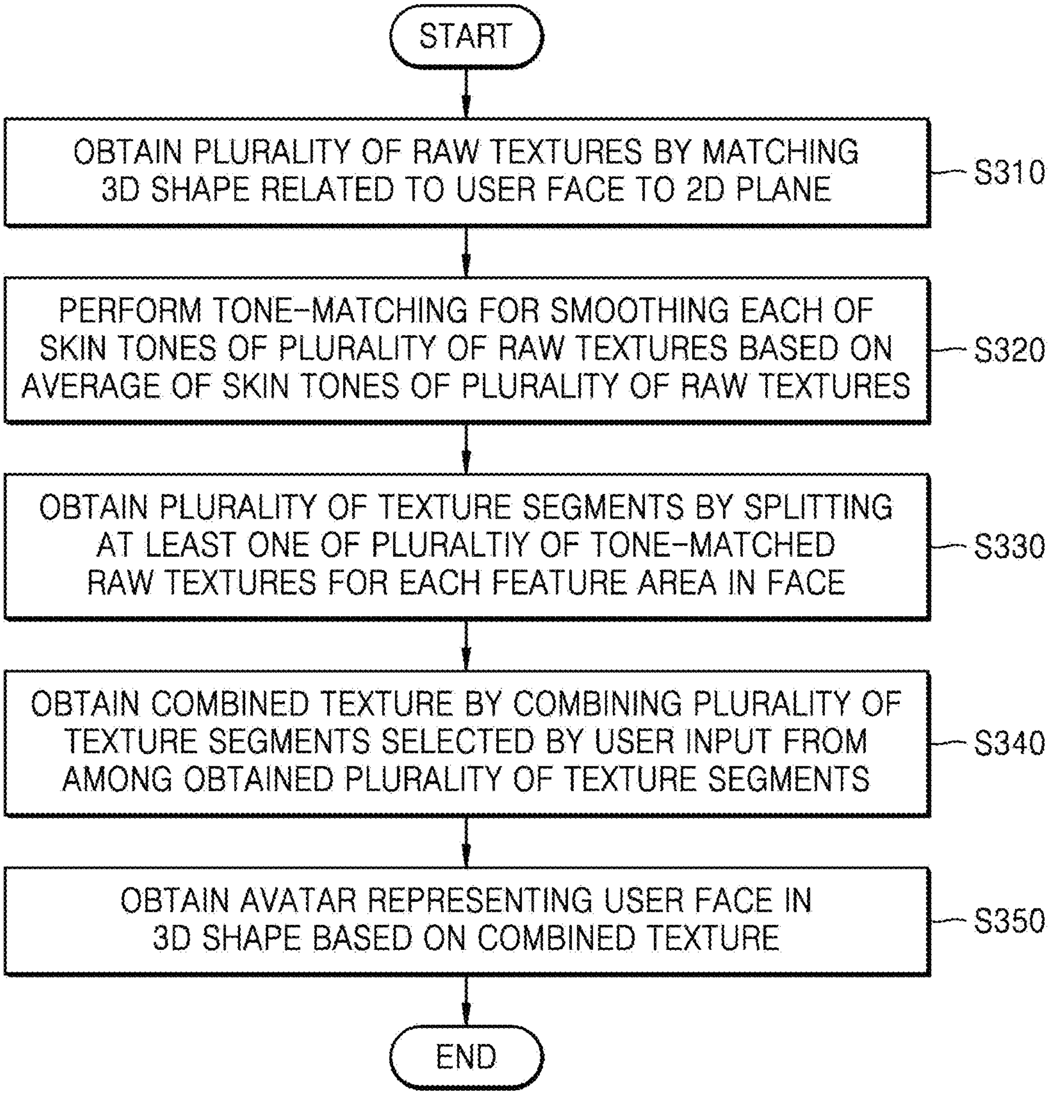
FIG. 3 is a flowchart illustrating an operating method of an electronic device, according to an embodiment of the disclosure.

FIG. 3 is a flowchart illustrating an operating method of an electronic device, according to an embodiment of the disclosure. The same description that made with reference to FIG. 1 will be briefly provided or omitted.

Referring to FIG. 3, in operation S310, an electronic device may obtain a plurality of raw textures by matching a 3D shape related to a user face to a 2D plane.

In an embodiment, the electronic device may obtain a face image by photographing a front surface of the user face including two eyes, nose, and mouth. The face image may be a flat image obtained by photographing a 3D shape related to a user's face. The electronic device may obtain a 3D shape image from the face image. For example, the electronic device obtains a 3D shape image of the user's face from the face image, by using a 3D morphable model (3DMM)-based avatar generation technology.

In an embodiment, the electronic device may obtain a plurality of raw textures based on the 3D shape image obtained from the face image. The electronic device may obtain a plurality of raw textures by matching a 3D shape of the face image included in the 3D shape image to a 2D plane. For example, the electronic device obtains a plurality of raw textures by unwrapping a 3D shape related to the user face on a 2D plane, by using a UV unwrapping method.

In operation S320, the electronic device may perform tone-matching for smoothing each of skin tones of the plurality of raw textures based on an average of the skin tones of the plurality of raw textures.

In an embodiment, the electronic device may obtain an average skin tone segment from the plurality of raw textures. Each raw texture may include a skin tone segment. The skin tone segment may include information about a skin tone included in a corresponding raw texture. The electronic device may obtain an average skin tone segment based on each skin tone segment obtained from each raw texture.

In an embodiment, the electronic device may obtain a plurality of tone-matching textures, by performing tone-matching for smoothing each of the skin tones of the plurality of raw textures based on the average skin tone segment.

In operation S330, the electronic device may obtain a plurality of texture segments by splitting at least one of the plurality of tone-matching textures for each feature area in the face.

In an embodiment, the electronic device may slit each tone-matching texture into a skin area, an eye area, a nose area, and a mouth area. Accordingly, the electronic device may obtain a plurality of texture segments. The plurality of texture segments may include a tone-matching skin tone segment, a tone-matching eye segment, a tone-matching nose segment, and a tone-matching mouth segment.

The tone-matching skin tone segment may be a piece image obtained by splitting the skin area in the tone-matching texture. The tone-matching eye segment may be a piece image obtained by splitting the eye area in the tone-matching texture. The tone-matching nose segment may be a piece image obtained by splitting the nose area in the tone-matching texture. The tone-matching mouth segment may be a piece image obtained by splitting the mouth area in the tone-matching texture. A reference area for splitting each tone-matching texture into segments will be described with reference to FIG. 5.

In operation S340, the electronic device may obtain a combined texture by combining a plurality of texture segments selected by a user input from among the obtained plurality of texture segments.

In an embodiment, the electronic device may obtain a combined texture by combining a plurality of texture segments selected one by one for each feature area by a user input. For example, the electronic device obtains a combined texture by combining one of a plurality of tone-matching skin tone segments, one of a plurality of tone-matching eye segments, one of a plurality of tone-matching nose segments, and one of a plurality of tone-matching mouth segments.

In operation S350, the electronic device may obtain an avatar representing the user face in a 3D shape based on the combined texture.

In an embodiment, the electronic device may obtain a 3D mesh related to the user's face. The 3D mesh may refer to a 3D shape related to the user's facial skeleton. The electronic device may obtain an avatar by mapping the combined texture to the 3D mesh.

In an embodiment, the electronic device may obtain an avatar by using a UV mapping method, that is, a method of projecting the combined texture, which is a 2D image, onto a surface of the 3D mesh.

Figure 4A:
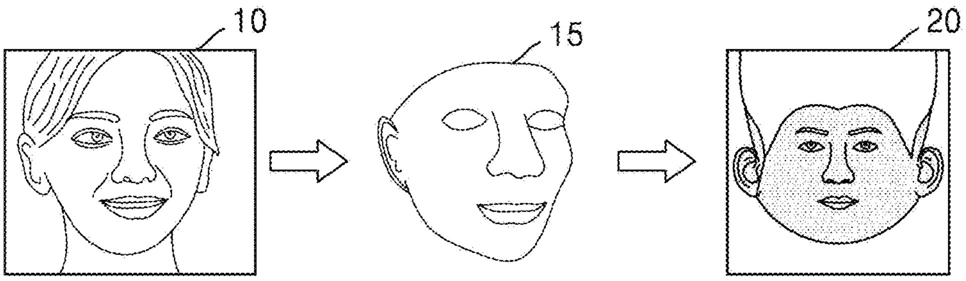
FIGS. 4A and 4B are diagrams for describing a method by which an electronic device obtains a raw texture related to a user face, according to various embodiments of the disclosure.
Figure 4B:
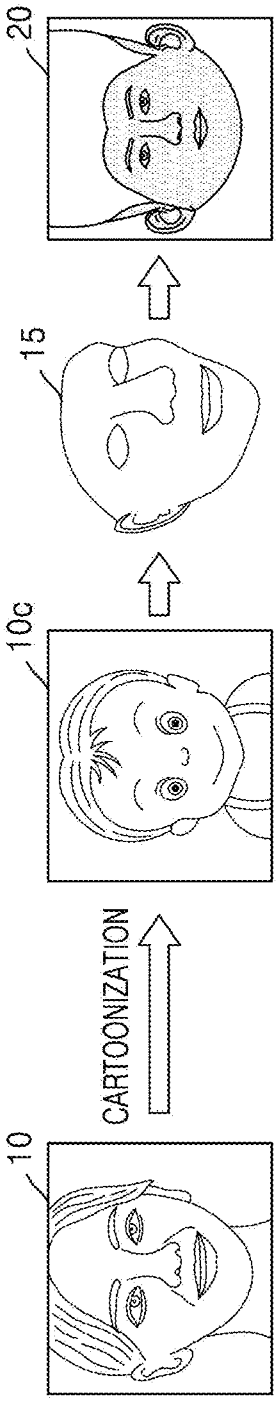

FIGS. 4A and 4B are diagrams for describing a method by which an electronic device obtains a raw texture related to a user face, according to various embodiments of the disclosure.

Referring to FIG. 4A, in an embodiment, the electronic device may obtain the face image 10. The electronic device may obtain a raw texture 20 by matching a 3D shape of the face image 10 to a 2D plane.

In detail, the electronic device may obtain a 3D shape image 15 from the face image 10.

The electronic device may obtain the 3D shape image 15 of a user's face from the face image 10, by using a 3D morphable model (3DMM)-based avatar generation technology. The electronic device may obtain face area pieces similar to the face image 10 from a 3D shape database, by comparing the face image 10 with the 3D shape database for pre-input face areas. The electronic device may obtain the 3D shape image 15 of the user's face by combining the similar face area pieces. The electronic device may obtain the 3D shape image 15 combined to be similar to the face image 10, by using a 3DMM-based avatar generation technology.

However, a method of obtaining the 3D shape image 15 is only an example, and the technical idea of the disclosure is not limited thereto.

In an embodiment, the electronic device may obtain the raw texture 20 based on the 3D shape image 15.

The raw texture 20 may be an image obtained by matching the user face to a 2D plane based on the 3D shape image 15. The raw texture 20 may be an image obtained by matching a 3D shape related to the user face in the 3D shape image 15 to a 2D plane. For example, the electronic device obtains the raw texture 20, which is a 2D image, by unwrapping a 3D shape related to the user face in the 3D shape image 15 on a 2D plane, by using a UV unwrapping method. However, a method of obtaining the raw texture 20 based on a 3D shape is only an example, and the technical idea of the disclosure is not limited thereto.

Referring to FIG. 4B, in an embodiment, the electronic device may obtain the face image 10. The electronic device may obtain a cartoon image 10*c* based on the face image 10. For convenience of explanation, the same description as that made with reference to FIG. 4A will be briefly provided or omitted.

The cartoon image 10*c* may be an image obtained by cartoonizing the user face included in the face image 10. The electronic device may obtain the cartoon image 10*c* by inputting the face image 10 to the cartoonization module 113 (see FIG. 2) and processing the face image 10 by using a cartoonization filter. In the disclosure, a method of cartoonizing the face image 10 is not limited to using a cartoonization filter.

In an embodiment, the electronic device may obtain the 3D shape image 15 from the cartoon image 10*c*. The electronic device may obtain the 3D shape image 15 of the user's face from the cartoon image 10*c*, by using a 3D morphable model (3DMM)-based avatar generation technology.

In an embodiment, the electronic device may obtain the raw texture 20 based on the 3D shape image 15. For example, the electronic device obtains the raw texture 20, which is a 2D image, by unwrapping a 3D shape related to the user face in the 3D shape image 15 on a 2D plane, by using a UV unwrapping method.

Figure 5:
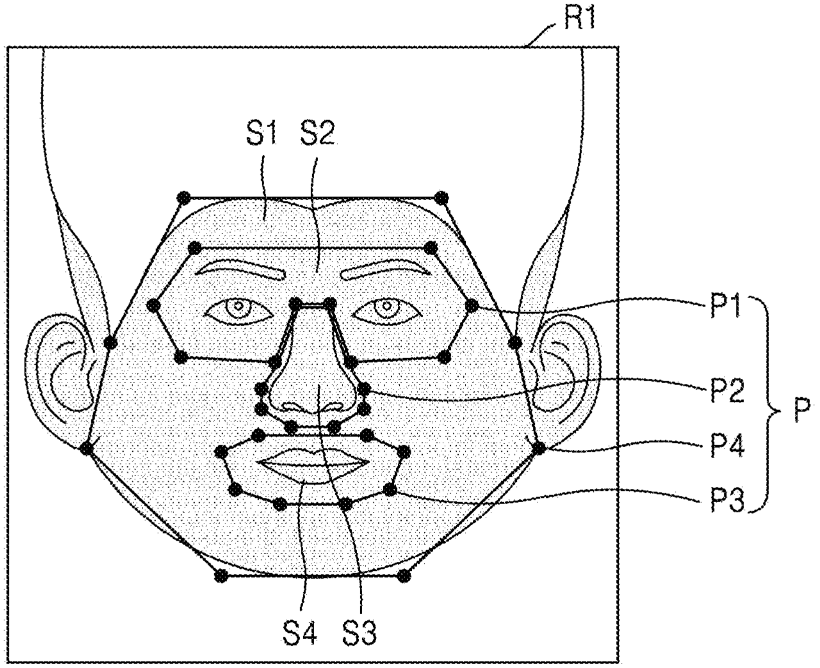
FIG. 5 is a diagram for describing a reference for splitting a plurality of segments corresponding to areas from a raw texture related to a user face in order for an electronic device to provide an avatar based on the user face, according to an embodiment of the disclosure.

FIG. 5 is a diagram for describing a reference for splitting a plurality of segments corresponding to areas from a raw texture related to a user face in order for an electronic device to provide an avatar based on the user face, according to an embodiment of the disclosure.

Referring to FIG. 5, a reference texture R1 may be an image obtained by matching a user face to a 2D plane.

The reference texture R1 may include a reference skin tone segment S1, a reference eye segment S2, a reference nose segment S3, and a reference mouth segment S4. The reference texture R1 may be divided into the reference skin tone segment S1, the reference eye segment S2, the reference nose segment S3, and the reference mouth segment S4 based on each face area.

The reference texture R1 may be divided into the reference skin tone segment S1, the reference eye segment S2, the reference nose segment S3, and the reference mouth segment S4 based on a reference point P. The reference point P may be set to distinguish face areas. The reference point P may include first to fourth reference points P1, P2, P3, and P4.

The reference eye segment S2 may be a piece image corresponding to an area connecting a plurality of first reference points P1. The reference eye segment S2 may be an image including a user's two eyes. Although one first reference point P1 from among the plurality of first reference points is illustrated for convenience of explanation, a plurality of reference points for forming an area of the reference eye segment S2 may all refer to the first reference points P1.

The reference nose segment S3 may be a piece image corresponding to an area connecting a plurality of second reference points P2. The reference nose segment S3 may be an image including the user's nose. Although one second reference point P2 from among the plurality of second reference points is illustrated for convenience of explanation, a plurality of reference points for forming an area of the reference nose segment S3 may all refer to the second reference points P2.

The reference mouth segment S4 may be a piece image corresponding to an area connecting a plurality of third reference points P3. The reference mouth segment S4 may be an image including the user's mouth. Although one third reference point P3 from among the plurality of third reference points is illustrated for convenience of explanation, a plurality of reference points for forming an area of the reference mouth segment S4 may all refer to the third reference points P3.

The reference skin tone segment S1 may be a piece image corresponding to an area connecting a plurality of fourth reference points P4. The reference skin tone segment S1 may be a piece image corresponding to an area excluding the areas of the reference eye segment S2, the reference nose segment S3, and the reference mouth segment S4, in the area connecting the plurality of fourth reference points P4. The reference skin tone segment S1 may be an image including a skin area excluding the user's eyes, nose, and mouth. Although one fourth reference point P4 from among the plurality of fourth reference points is illustrated for convenience of explanation, a plurality of reference points for forming an area of the reference skin tone segment S1 may all refer to the fourth reference points P4.

In an embodiment, the reference point P may be set based on positions of muscles and bones included in the face. In detail, one of the first reference points P1 may be located at an upper edge of a nasal muscle (nose muscle). One of the first reference points P1 located at the upper edge of the nasal muscle may be used to obtain the reference eye segment S2 from the reference texture R1.

However, a set position of the reference point P is only an example, and the technical idea of the disclosure is not limited thereto. The electronic device according to an embodiment may combine texture segments divided from a raw texture without awkwardness by setting a certain reference point. Accordingly, the electronic device may obtain a combined texture by combining the divided texture segments.

Figure 9:
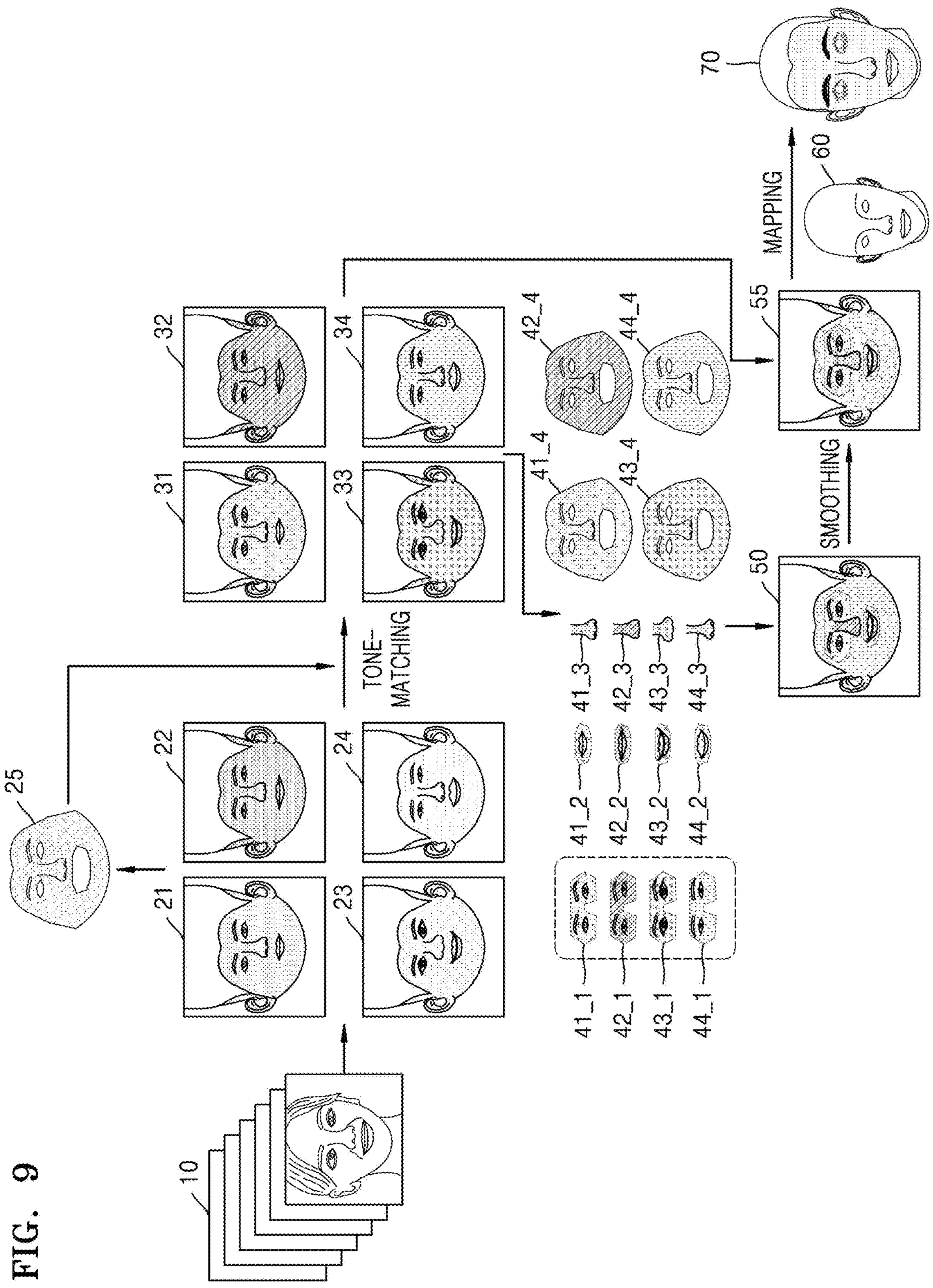
FIG. 9 is a conceptual diagram illustrating an operation in which an electronic device provides an avatar based on a user face, according to an embodiment of the disclosure.

The electronic device for providing an avatar according to an embodiment of the disclosure may obtain the plurality of raw textures (e.g., 21, 22, 23, and 24) (see FIGS. 1 and 9), the plurality of tone-matching textures (e.g., 31, 32, 33, and 34) (see FIGS. 1 and 9), the combined texture 50 (see FIGS. 1 and 9), and a smoothing texture 55 (see FIG. 9). Each of the plurality of raw textures (e.g., 21, 22, 23, and 24) (see FIGS. 1 and 9), the plurality of tone-matching textures (e.g., 31, 32, 33, and 34) (see FIGS. 1 and 9), the combined texture 50 (see FIGS. 1 and 9), and the smoothing texture 55 (see FIG. 9) may include a skin tone segment, an eye segment, a nose segment, and a mouth segment. For convenience of explanation, the reference texture R1 of FIG. 5 is illustrated to describe a reference for splitting a face area into segments, and the reference for splitting a face area into segments may be applied to the plurality of raw textures (e.g., 21, 22, 23, and 24) (see FIGS. 1 and 9), the plurality of tone-matching textures (e.g., 31, 32, 33, and 34) (see FIGS. 1 and 9), the combined texture 50 (see FIGS. 1 and 9), and the smoothing texture 55 (see FIG. 9).

Figure 6:
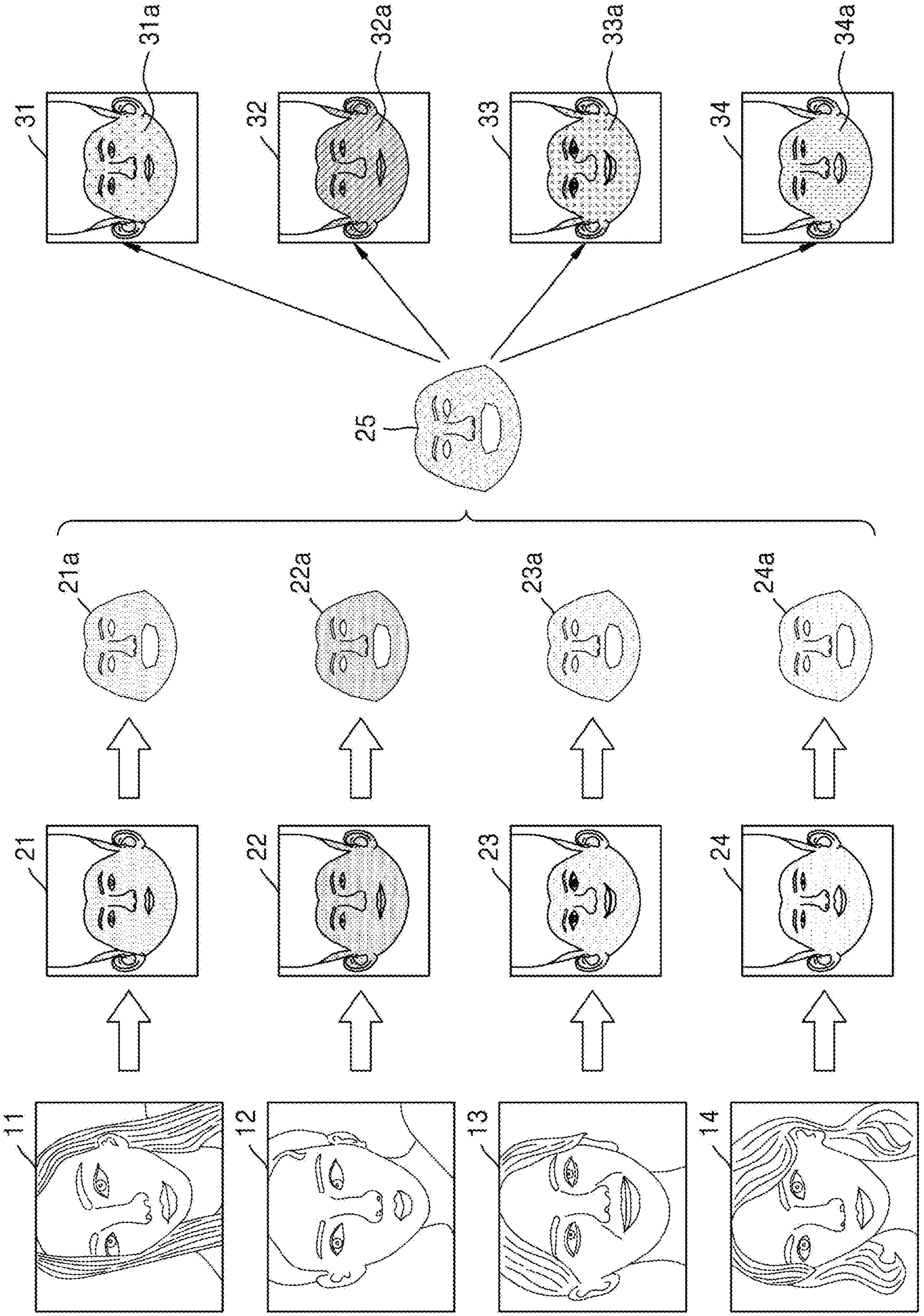
FIG. 6 is a diagram for describing a method by which an electronic device tone-matches raw textures related to a user face based on the user face, according to an embodiment of the disclosure.

FIG. 6 is a diagram for describing a method by which an electronic device tone-matches raw textures related to a user face based on the user face, according to an embodiment of the disclosure. The same description as that made with reference to FIG. 1 will be briefly provided or omitted.

Referring to FIG. 6, in an embodiment, an electronic device may obtain a plurality of face images. The plurality of face images may include first to fourth face images 11, 12, 13, and 14.

The first to fourth face images 11, 12, 13, and 14 may be images including a first user's face photographed in different situations. For example, the first to fourth face images 11, 12, 13, and 14 include the first user's face to which makeup is applied through different skin makeup methods.

The electronic device may obtain the first raw texture 21 based on the first face image 11. The electronic device may obtain the first raw texture 21 by matching a 3D shape of the first user's face included in the first face image 11 to a 2D plane.

In an embodiment, as described with reference to FIG. 4A, the electronic device may obtain the 3D shape image 15 (see FIG. 4A) based on the first face image 11. The electronic device may obtain the first raw texture 21 corresponding to the first face image 11 based on the 3D shape image 15.

In an embodiment, the electronic device may obtain a first raw skin tone segment 21*a* from the first raw texture 21. The first raw skin tone segment 21*a* may include information about a skin tone included in the corresponding first raw texture 21 and the corresponding first face image 11. The skin tone may refer to a color of the skin.

Although the first face image 11, the first raw texture 21, and the first raw skin tone segment 21*a* are mainly described for convenience of explanation, second to fourth raw skin tone segments 22*a*, 23*a*, and 24 may be obtained by using the same method as a method of obtaining the first raw skin tone segment 21*a*.

The first to fourth raw skin tone segments 21*a*, 22*a*, 23*a*, and 24*a* may include information about various skin tones according to a makeup method of the first user's face, brightness, weather, illuminance, and the like, included in the first to fourth face images 11, 12, 13, and 14.

In an embodiment, the electronic device may obtain the average skin tone segment 25 based on the first to fourth raw skin tone segments 21*a*, 22*a*, 23*a*, and 24*a*. The average skin tone segment 25 may include information about at least one of an average color, an average saturation, and an average brightness of the first to fourth raw skin tone segments 21*a*, 22*a*, 23*a*, and 24*a*.

In an embodiment, the electronic device may perform tone-matching for smoothing skin tones of the first to fourth raw textures 21, 22, 23, and 24 based on the average skin tone segment 25. The electronic device may obtain the first to fourth tone-matching textures 31, 32, 33, and 34 by performing tone-matching. The electronic device may obtain the first to fourth tone-matching textures 31, 32, 33, and 34 by respectively tone-matching the first to fourth raw textures 21, 22, 23, and 24.

In the disclosure, when a skin tone or a skin tone segment is smoothed, it may mean that at least one of colors, saturations, and brightness of skin tones included in a plurality of raw textures is harmonized so that a plurality of skin tones included in the plurality of raw textures have similar skin tones.

For example, the electronic device changes the first raw skin tone segment 21*a* included in the first raw texture 21 to be closer to a skin tone according to the average skin tone segment 25. That is, the electronic device may obtain a first tone-matching skin tone segment 31*a* having a skin tone closer to the average skin tone segment 25 than the first raw skin tone segment 21*a*.

The electronic device may obtain the first tone-matching texture 31 including the first tone-matching skin tone segment 31*a*. The first tone-matching texture 31 may further include a first tone-matching eye segment, a first tone-matching nose segment, and a first tone-matching mouth segment. A shape of eyes according to the first tone-matching eye segment may be the same a shape of eyes included in the first raw texture 21. A shape of a nose according to the first tone-matching nose segment may be the same as a shape of a nose included in the first raw texture 21. A shape of a mouth according to the first tone-matching mouth segment may be the same as a shape of a mouth included in the first raw texture 21. That is, the first tone-matching texture 31 may include a skin tone according to the first tone-matching skin tone segment 31*a* obtained by smoothing a skin tone of the first raw texture 21, but may include the same shapes as those of eyes, nose, and mouth included in the first raw texture 21.

Although a method of obtaining the first tone-matching texture 31 by smoothing the first raw texture 21 is mainly described for convenience of explanation, the second to fourth tone-matching textures 32, 33, and 34 may be obtained by using the same method as a method of obtaining the first tone-matching texture 31.

Figure 7:
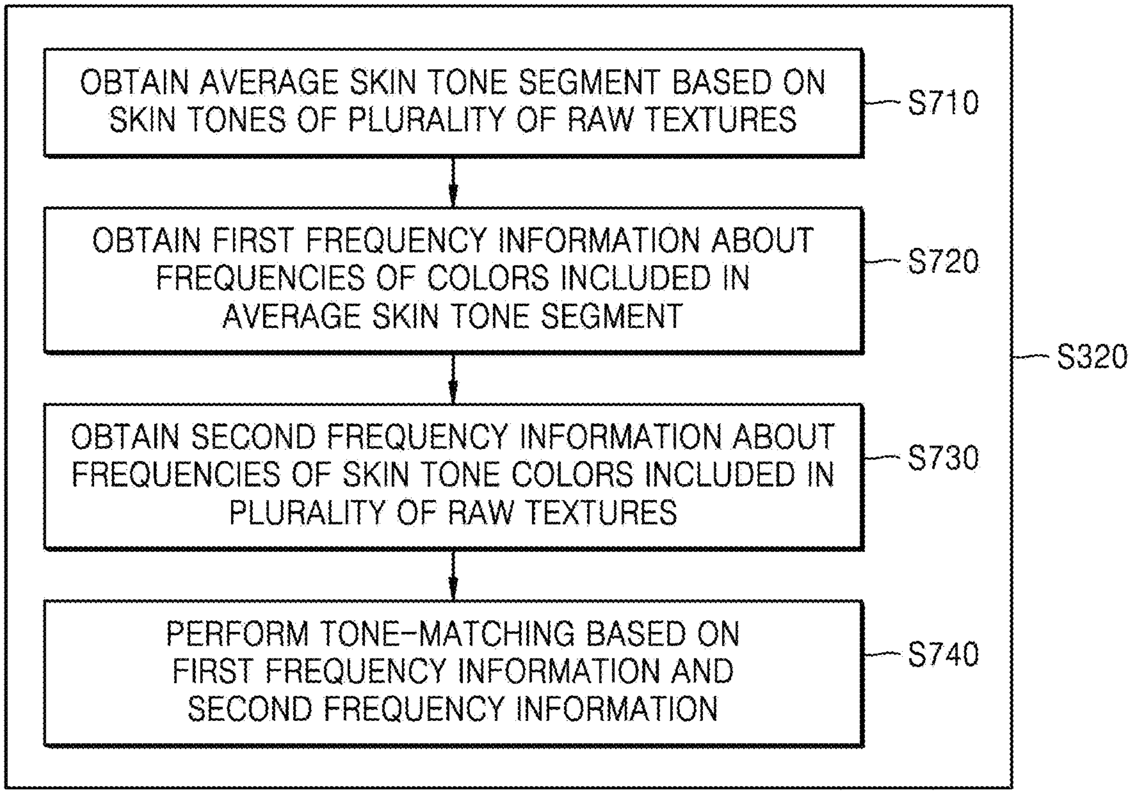
FIG. 7 is a flowchart illustrating an operating method of an electronic device for tone-matching raw textures related to a user face based on the user face, according to an embodiment of the disclosure.

FIG. 7 is a flowchart illustrating an operating method of an electronic device for tone-matching raw textures related to a user face based on the user face, according to an embodiment of the disclosure.

Figure 8:
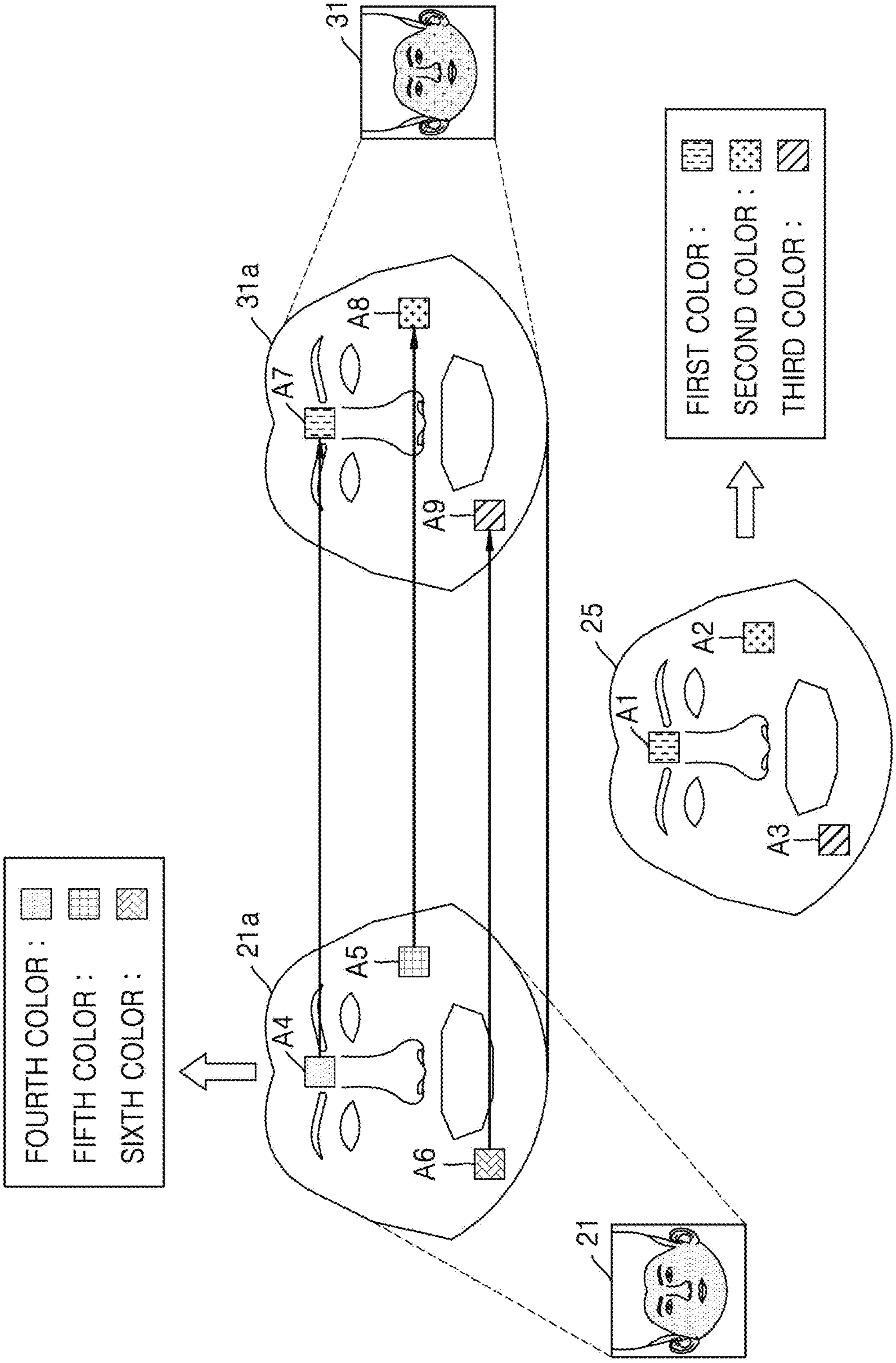
FIG. 8 is a diagram for describing a method of tone-matching raw textures related to a user face based on the user face, according to an embodiment of the disclosure.

FIG. 8 is a diagram for describing a method of tone-matching raw textures related to a user face based on the user face, according to an embodiment of the disclosure.

For convenience of explanation, the same description as that made with reference to FIGS. 1 to 3, 4A, 4B, 5, and 6 will be briefly provided or omitted. For reference, although a method of obtaining the first tone-matching texture 31 by tone-matching the first raw texture 21 is described with reference to FIG. 8, the second to fourth tone-matching textures 32, 33, and 34 (see FIG. 6) may also be obtained by using the same method.

Referring to FIGS. 7 and 8 together, operation S320 described with reference to FIG. 3 may include operations S710 to S740.

In operation S710, the electronic device may obtain the average skin tone segment 25 based on skin tones of the plurality of raw textures (e.g., 21 to 24) (see FIG. 6).

In operation S720, the electronic device may obtain first frequency information about frequencies of colors included in the average skin tone segment 25.

In an embodiment, the first frequency information may include information about frequencies of a first color, a second color, and a third color included in the average skin tone segment 25. The first color may be a color with a highest frequency in the average skin tone segment 25. The second color may be a color with a second highest frequency in the average skin tone segment 25. The third color may be a color with a third highest frequency in the average skin tone segment 25.

As shown in FIG. 8, the first color may be a color of a first area A1 of the average skin tone segment 25. The second color may be a color of a second area A2 of the average skin tone segment 25. The third color may be a color of a third area A3 of the average skin tone segment 25.

Although the first to third colors, that is, three colors, are mainly described for convenience of explanation, the number of colors does not limit the technical idea of the disclosure.

In operation S730, the electronic device may obtain second frequency information about frequencies of skin tone colors included in the plurality of raw textures.

In an embodiment, the second frequency information may include information about frequencies of a fourth color, a fifth color, and a sixth color included in the plurality of raw textures. For example, the second frequency information includes information about frequencies of the fourth color, the fifth color, and the sixth color included in the first raw texture 21. The fourth color may be a color with a highest frequency in the first raw texture 21. The fifth color may be a color with a second highest frequency in the first raw texture 21. The sixth color may be a color with a third highest frequency in the first raw texture 21.

As shown in FIG. 8, the fourth color may be a color of a fourth area A4 of the first raw texture 21. The fifth color may be a color of a fifth area A5 of the first raw texture 21. The sixth color may be a color of a sixth area A6 of the first raw texture 21.

In operation S740, the electronic device may perform tone-matching based on the first frequency information and the second frequency information.

In an embodiment, the electronic device may obtain the first tone-matching texture 31 by tone-matching the first raw texture 21, based on the first frequency information and the second frequency information.

In detail, the electronic device may match the first color that is a color with a highest frequency in the average skin tone segment 25 to the fourth color that is a color with a highest frequency in the first raw texture 21. The electronic device may change a color of the first area A1 of the first raw texture 21 from the first color to the fourth color.

Also, the electronic device may match the second color that is a color with a second highest frequency in the average skin tone segment 25 to the fifth color that is a color with a second highest frequency in the first raw texture 21. The electronic device may change a color of the second area A2 of the first raw texture 21 from the second color to the fifth color.

Also, the electronic device may match the third color that is a color with a third highest frequency in the average skin tone segment 25 to the sixth color that is a color with a third highest frequency in the first raw texture 21. The electronic device may change a color of the third area A3 of the first raw texture 21 from the third color to the sixth color.

As a result, the electronic device may obtain the first tone-matching texture 31 by tone-matching the first raw texture 21. The first tone-matching texture 31 may include a seventh area A7 having the first color, an eighth area A8 having the second color, and a ninth area A9 having the third color. That is, the electronic device may change colors of the first raw texture 21 according to a frequency order of colors of the first raw texture 21, based on an order in which frequencies of colors of the average skin tone segment 25 are high. Accordingly, the electronic device may obtain the first tone-matching texture 31 by changing colors of the first raw texture 21.

FIG. 9 is a diagram for describing a method by which an electronic device smooths a combined texture obtained based on a database related to each area in a user face, according to an embodiment of the disclosure.

Figure 10:
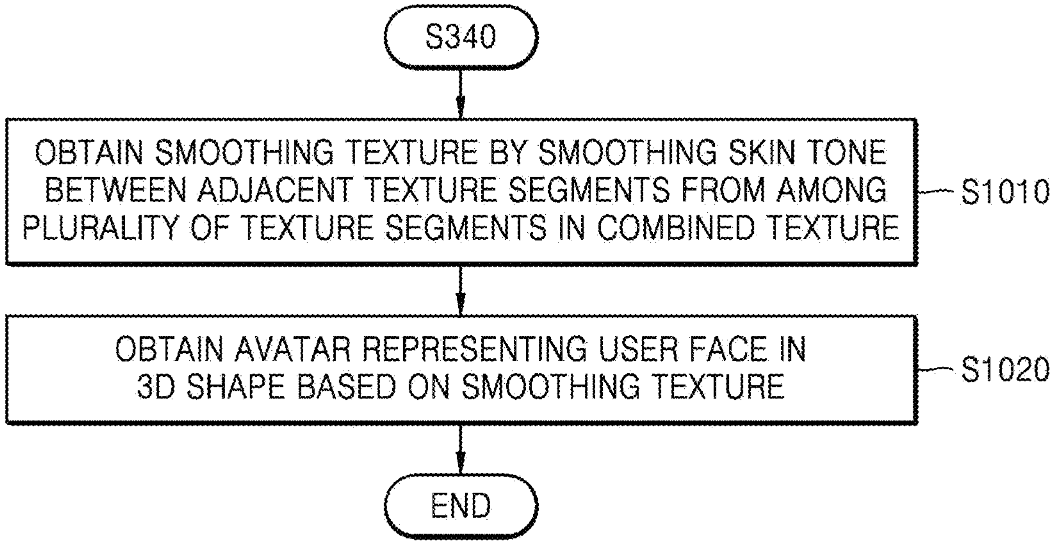
FIG. 10 is a flowchart illustrating an operating method of an electronic device for smoothing a combined texture obtained based on a database related to each area in a user face, according to an embodiment of the disclosure.

FIG. 10 is a flowchart illustrating an operating method of an electronic device for smoothing a combined texture obtained based on a database related to each area in a user face, according to an embodiment of the disclosure.

For convenience of explanation, the same description as that made with reference to FIG. 1 will be briefly provided or omitted.

Referring to FIGS. 9 and 10 together, operation S1010 of FIG. 10 may be performed after operation S340 of FIG. 3 is performed.

In operation S1010, the electronic device may smooth a skin tone between two adjacent texture segments from among a plurality of texture segments in the combined texture 50.

In an embodiment, the electronic device may obtain the smoothing texture 55 by smoothing the combined texture 50. The electronic device may smooth a skin tone between adjacent texture segments in the combined texture 50.

For example, the combined texture 50 is an image obtained by combining the first tone-matching eye segment 41_1 with the second tone-matching skin tone segment 42_4. Because the first tone-matching eye segment 41_1 and the second tone-matching skin tone segment 42_4 may not have the same skin tone, there may be a heterogeneity around a boundary between the first tone-matching eye segment 41_1 and the second tone-matching skin tone segment 42_4.

In an embodiment, the electronic device may smooth a boundary between adjacent texture segments in the combined texture 50. That is, the electronic device may smooth a boundary between the first tone-matching eye segment 41_1 and the second tone-matching skin tone segment 42_4 adjacent to each other in the combined texture 50.

In an embodiment, the electronic device may harmonize a skin tone between adjacent texture segments in the combined texture 50. The electronic device may perform an operation of harmonizing a skin tone between adjacent texture segments after a smoothing operation.

In an embodiment, the smoothing module 112 (see FIG. 2) of the electronic device may include instructions or program code related to a function and/or operation of blurring and smoothing a boundary between adjacent texture segments. Also, the smoothing module 112 (see FIG. 2) of the electronic device may include instructions or program code related to a function and/or operation of harmonizing skin tones of adjacent texture segments.

In operation S1020, the electronic device may obtain the avatar 70 indicating a user face in a 3D shape based on the smoothing texture 55. The description of operation S1020 is similar to that of operation S350 of FIG. 3, and thus, will be briefly provided.

In an embodiment, the electronic device may obtain the 3D mesh 60 related to a user's face. The electronic device may obtain the avatar 70 by mapping the smoothing texture 55 to the 3D mesh 60.

In an embodiment, the electronic device may obtain the avatar 70 by using a UV mapping method, that is, a method of projecting the smoothing texture 55, which is a 2D image, onto a surface of the 3D mesh 60.

Figure 11:
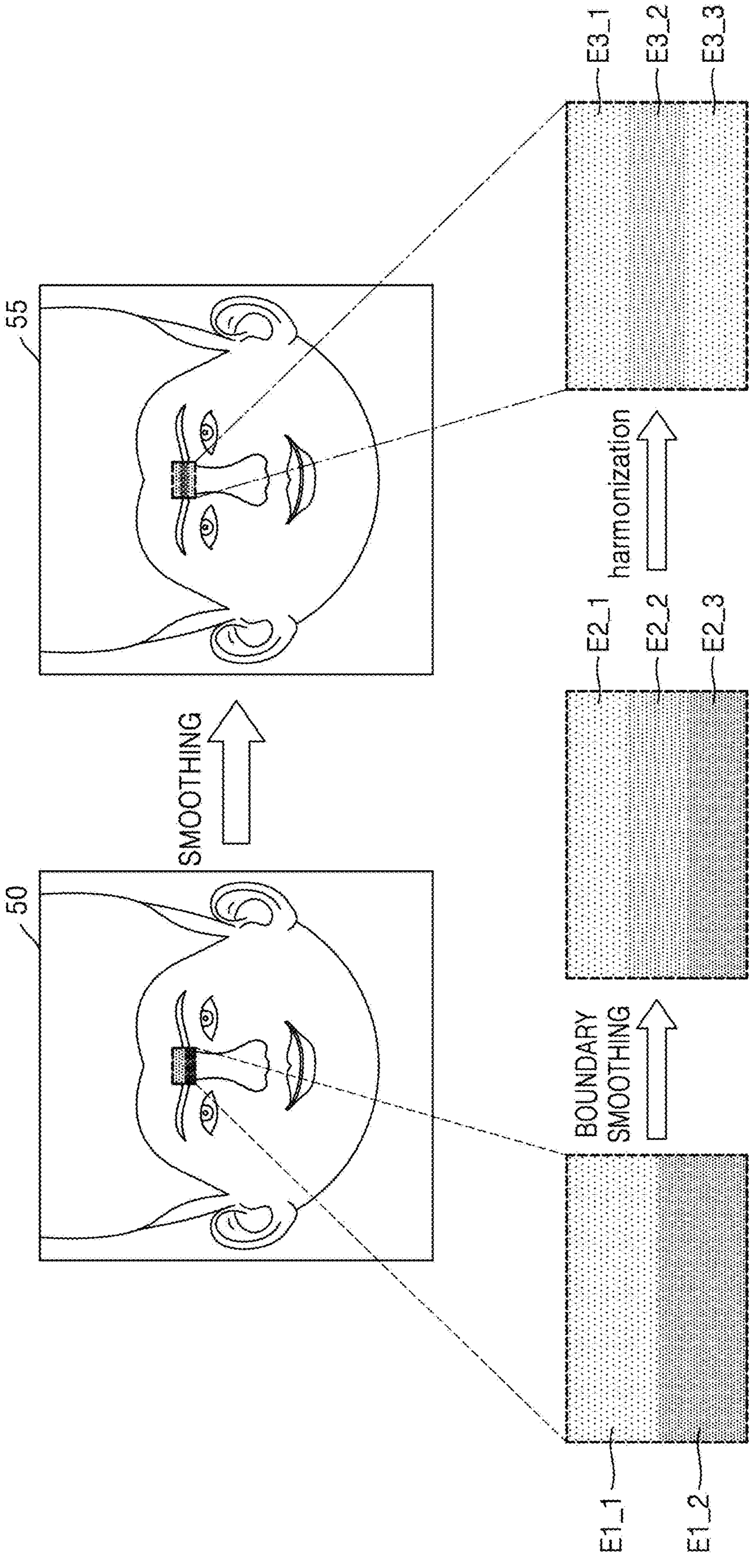
FIG. 11 is a diagram for specifically describing a method by which an electronic device smooths a combined texture, according to an embodiment of the disclosure.

FIG. 11 is a diagram for specifically describing a method by which an electronic device smooths a combined texture, according to an embodiment of the disclosure.

Referring to FIG. 11, an electronic device may obtain the smoothing texture 55 by smoothing the combined texture 50. The electronic device may obtain the smoothing texture 55 by smoothing a boundary between two adjacent segments in the combined texture 50 and harmonizing a skin tone between two adjacent texture segments in the combined texture 50.

In an embodiment, the electronic device may smooth a boundary between two adjacent texture segments in the combined texture 50. Although a skin tone segment and an eye segment adjacent to each other are described as two adjacent texture segments in FIG. 11, this is only an example, and the technical idea of the disclosure is not limited thereto. For example, adjacent texture segments in the combined texture 50 is a skin tone segment and an eye segment, a skin tone segment and a nose segment, a skin tone segment and a mouth segment, an eye segment and a nose segment, and a nose segment and a mouth segment.

In an embodiment, when a skin tone or a skin tone segment is smoothed, it may mean that at least one of colors, saturations, and brightness of skin tones included in a plurality of texture segments is harmonized so that a plurality of texture segments included in the combined texture 50 have similar skin tones.

The combined texture 50 may include a first boundary area E1 (E1_1 and E1_2). The first boundary area E1 may include areas of two adjacent texture segments. For example, as shown in FIG. 11, the first boundary area E1 includes a part of an area of a skin tone segment and a part of an area of an eye segment.

The first boundary area E1 may include a 1_1 area E1_1 and a 1_2 area E1_2. The 1_1 area E1_1 may be an area of one of two adjacent texture segments in the combined texture 50. The 1_2 area E1_1 may be an area of the other of the two adjacent texture segments in the combined texture 50.

For example, the 1_1 area E1_1 is an area of the skin tone segment of the combined texture 50. The 1_2 area E1_1 may be an area of the eye segment of the combined texture 50. A skin tone of the skin tone segment of the combined texture 50 may be different from a skin tone of the eye segment of the combined texture 50.

The electronic device may smooth a boundary between the 1_1 area E1_1 and 1_2 area E1_1. Accordingly, an intermediate area 2_2 area E2_2 may be formed between the 1_1 area E1_1 and the 1_2 area E1_1. As a boundary between the 1_1 area E1_1 and the 1_2 area E1_1 is smoothed, the electronic device may divide the first area E1 into a 2_1 area E2_1, a 2_2 area E2_2, and a 2_3 area E2_3.

The 2_1 area E2_1 may be an unsmoothed area in the 1_1 area E1_1. The 2_2 area E2_2 may include a smoothed area in the 1_1 area E1_1 and a smoothed area in the 1_2 area E1_1. The 2_3 area E2_3 may be an unsmoothed area in the 1_2 area E1_1.

A color difference between the 2_2 area E2_2 and the 2_1 area E2_1 after smoothing may be less than a color difference between the 1_1 area E1_1 and the 1_2 area E1_1 before smoothing. Also, a color difference between the 2_2 area E2_2 and the 2_3 area E2_3 after smoothing may be less than a color difference between the 1_1 area E1_1 and the 1_2 area E1_1 before smoothing.

In an embodiment, the electronic device may smooth two adjacent texture segments in the combined texture 50, by using a Gaussian smoothing method of filtering an image by using a filter mask generated by approximating a Gaussian distribution function. For example, the electronic device performs a Gaussian smoothing filter at a boundary between the eye segment (the 1_2 area E1_2) and the skin tone segment (the 1_1 area E1_1) adjacent to each other in the combined texture 50. Accordingly, the electronic device may minimize a subtle color difference formed along the boundary between the eye segment and the skin tone segment adjacent to each other.

However, a method of smoothing the combined texture 50 is only an example, and the technical idea of the disclosure is not limited thereto.

In an embodiment, the electronic device may harmonize a skin tone between adjacent texture segments in the combined texture 50. Although the skin tone segment and the eye segment adjacent to each other are described as adjacent texture segments in FIG. 11, this is only an example, and the technical idea of the disclosure is not limited thereto. For example, adjacent texture segment in the combined texture 50 is a skin tone segment and an eye segment, a skin tone segment and a nose segment, a skin tone segment and a mouth segment, an eye segment and a nose segment, and a nose segment and a mouth segment.

Skin tones of adjacent textures segments in a smoothed combined texture may be different from each other. The electronic device may minimize a subtle color difference formed along a boundary between adjacent texture segments according to smoothing, and then may harmonize skin tones of the adjacent texture segments. For example, the electronic device smooths a boundary between an eye segment and a nose segment adjacent to each other in the combined texture 50, and then harmonizes a skin tone of the eye segment and a skin tone of the nose segment.

In an embodiment, the electronic device may harmonize a skin tone between adjacent texture segments by using a generative model that is a deep learning model. For example, the electronic device harmonizes a skin tone between adjacent texture segments by using a generative adversarial network (GAN). However, a model for harmonizing a skin tone between adjacent texture segments is only an example, and the technical idea of the disclosure is not limited thereto.

The electronic device may harmonize a skin tone between two adjacent texture segments in the smoothed combined texture. For example, as shown in FIG. 11, the smoothed combined texture includes the 2_1 area E2_1, the 2_2 area E2_2, and the 2_3 area E2_3 between the skin tone segment and the eye segment adjacent to each other.

The electronic device may harmonize a skin tone between the 2_1 area E2_1 and the 2_3 area E2_3. In an embodiment, the electronic device may change a skin tone of the 2_3 area E2_3 based on a skin tone of the 2_1 area E2_1. The electronic device may change a skin tone of the 2_3 area E2_3 to match a skin tone of the 2_1 area E2_1. In an embodiment, the electronic device may change a skin tone of the 2_1 area E2_1 to match a skin tone of the 2_3 area E2_3.

However, an area based on which a skin tone is changed is only an example, and the technical idea of the disclosure is not limited thereto. For example, the electronic device changes both a skin tone of the 2_1 area E2_1 and a skin tone of the 2_2 area E2_2 so that the skin tone of the 2_1 area E2_1 and the skin tone of the 2_2 area E2_2 match each other.

However, whether skin tones match each other is only an example, and the technical idea of the disclosure is not limited thereto. For example, the electronic device changes a skin tone of the 2_3 area E2_3 to be closer to a skin tone of the 2_1 area E2_1.

Figure 12:
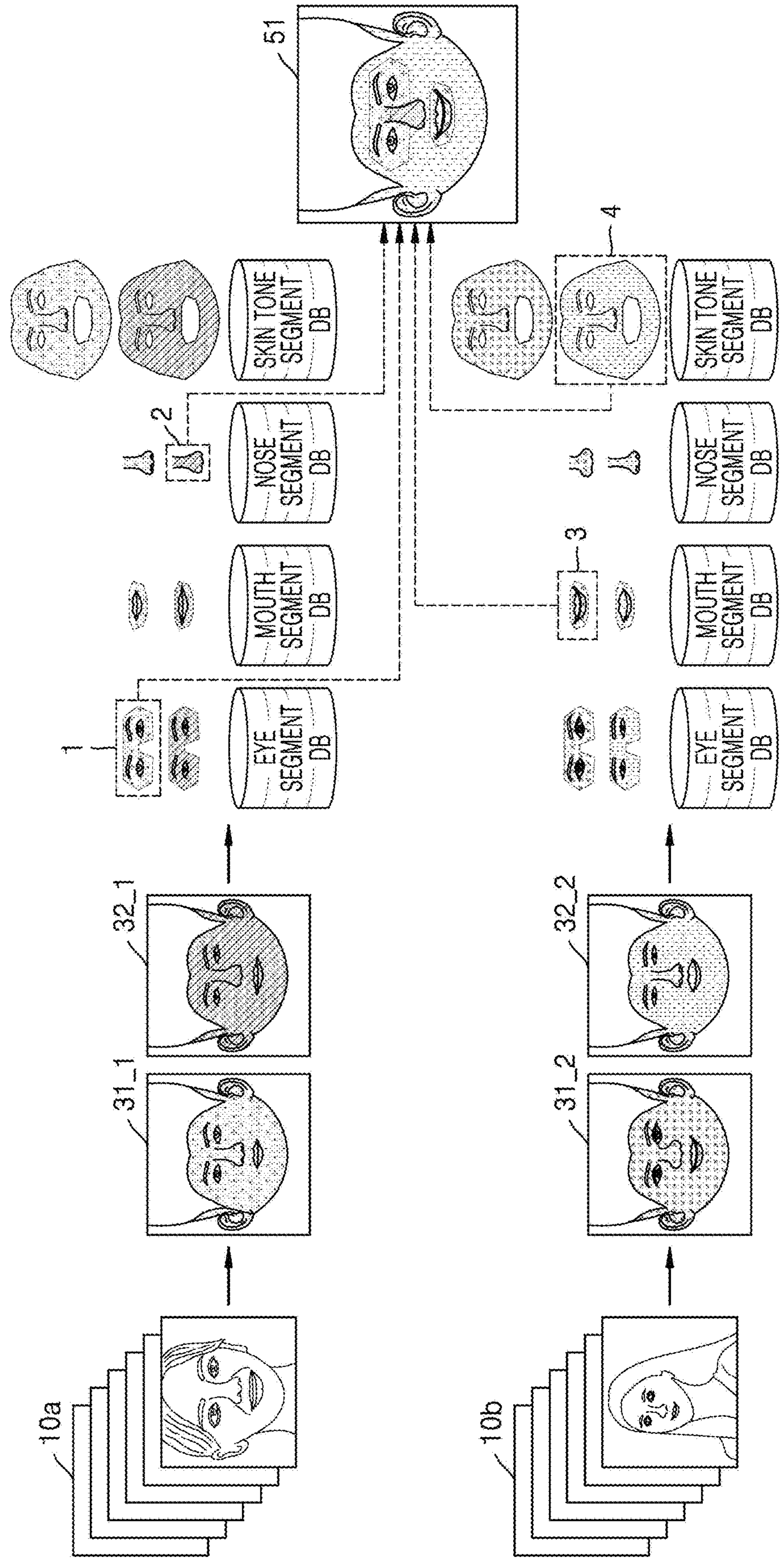
FIG. 12 is a diagram for describing a method by which an electronic device obtains a combined texture from faces of multiple users, according to an embodiment of the disclosure.

FIG. 12 is a diagram for describing a method by which an electronic device obtains a combined texture from faces of multiple users, according to an embodiment of the disclosure. For convenience of explanation, the same description as that made with reference to FIG. 1 will be briefly provided or omitted.

Referring to FIG. 12, in an embodiment, an electronic device may obtain the face image 10 (see FIG. 1) including a user face. The face image may include a first face image 10*a* including a first user face and a second face image 10*b* including a second user face. A first user and a second user may be different users.

In an embodiment, the electronic device may obtain a plurality of tone-matching textures based on the face image.

The electronic device may obtain a 1_1 tone-matching texture 31_1 and a 2_1 tone-matching texture 32_1 based on the first face image 10*a*. Also, the electronic device may obtain a 1_2 tone-matching texture 31_2 and a 2_2 tone-matching texture 32_2 based on the second face image 10*b*. Although only two tone-matching textures are used for each user for convenience of explanation, the technical idea is not limited thereto.

The description of the 1_1 tone-matching texture 31_1, the 2_1 tone-matching texture 32_1, the 1_2 tone-matching texture 31_2, and the 2_2 tone-matching texture 32_2 is similar to that of the first to fourth tone-matching textures 31 to 34 of FIG. 1, and thus, will be omitted.

Although the description of a configuration of obtaining a plurality of raw textures and an average skin tone segment in order for an electronic device to obtain a plurality of tone-matching textures is omitted for convenience of explanation, it may be the same as a method of obtaining a tone-matching texture described with reference to FIG. 1.

In an embodiment, the electronic device may obtain a plurality of texture segments by splitting the plurality of tone-matching texture for each feature area.

For example, as shown in FIG. 12, the electronic device obtains a 1_1 tone-matching segment 1 from among the plurality of texture segments, by splitting the 1_1 tone-matching texture 31_1 for each feature area. The electronic device may obtain a 2_1 tone-matching segment 2 from among the plurality of texture segments, by splitting the 2_1 tone-matching texture 32_1. The electronic device may obtain a 1_2 tone-matching segment 3 from among the plurality of texture segments, by splitting the 1_2 tone-matching texture 31_2 for each specific area. The electronic device may obtain a 2_2 tone-matching skin tone segment 4 from among the plurality of texture segments, by splitting the 2_2 tone-matching texture 32_2 for each feature area.

In an embodiment, the electronic device may obtain a combined texture 51 by combining a plurality of texture segments selected one by one for each feature area by a user input.

For example, the electronic device obtains the combined texture 51 by combining the 1_1 tone-matching eye segment 1, the 2_1 tone-matching nose segment 2, the 1_2 tone-matching mouth segment 3, and the 2_2 tone-matching skin tone segment 4. That is, the combined texture 51 may be obtained based on the first face image 10*a* of the first user and the second face image 10*b* of the second user.

Figure 13:
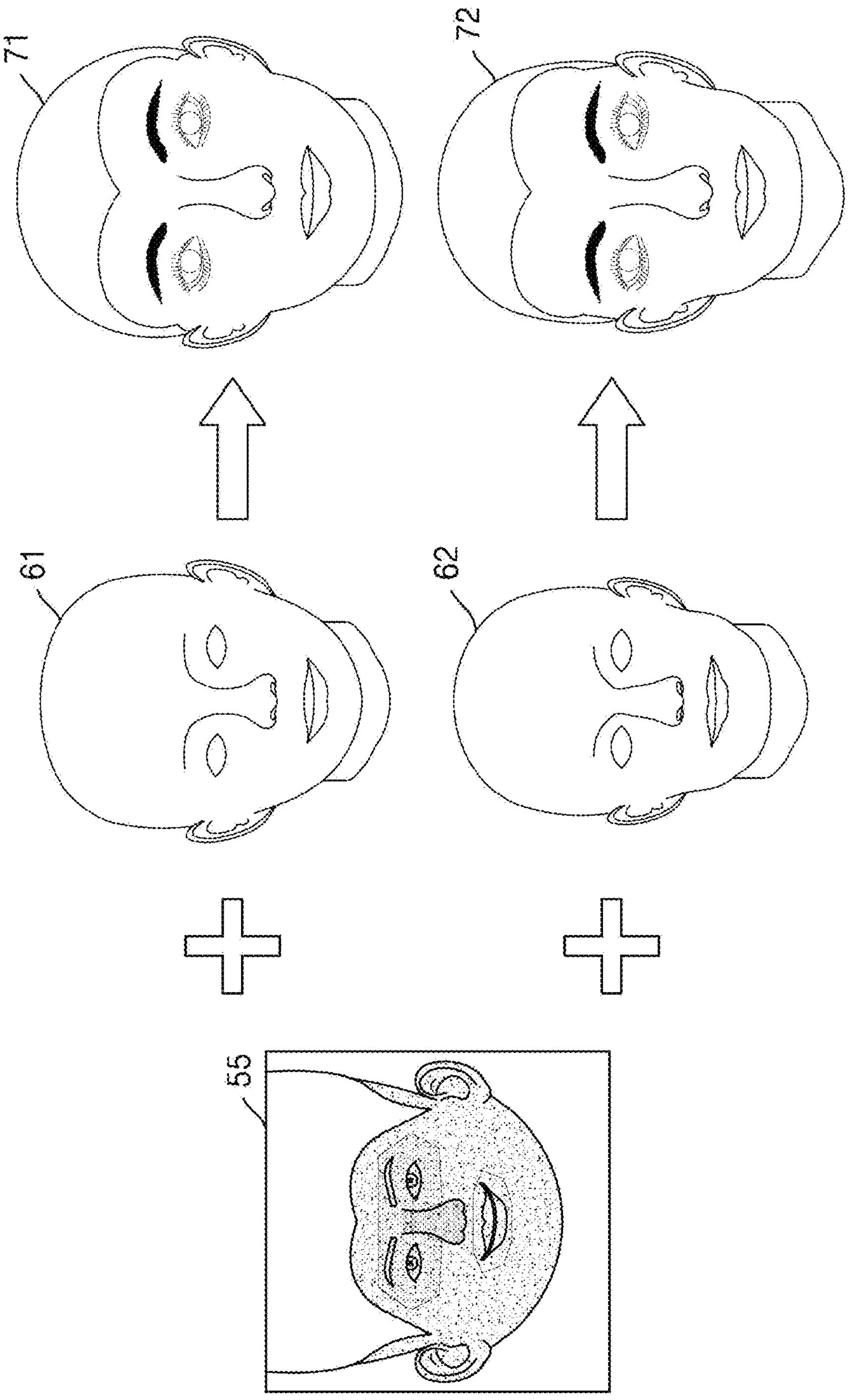
FIG. 13 is a diagram for describing a method by which an electronic device obtains an avatar based on a smoothing texture, according to an embodiment of the disclosure.

FIG. 13 is a diagram for describing a method by which an electronic device obtains an avatar based on a smoothing texture, according to an embodiment of the disclosure.

Referring to FIG. 13, an electronic device may obtain an avatar representing a user face in a 3D shape based on the smoothing texture 55.

In an embodiment, the electronic device may obtain a 3D mesh related to a user's face. The 3D mesh may include a first mesh 61 and a second mesh 62. A shape of the 3D mesh may vary to shape facial skeletons of various users. For convenience of explanation, the first mesh 61 and the second mesh 62 from among various 3D meshes will be described as examples.

The electronic device may obtain a first avatar 71 by mapping the smoothing texture 55 to the first mesh 61. Also, the electronic device may obtain a second avatar 72 by mapping the smoothing texture 55 to the second mesh 62. The first avatar 71 and the second avatar 72 are obtained based on the same smoothing texture 55. Accordingly, the first avatar 71 and the second avatar 72 may have different skeletons according to a difference between used meshes, that is, the first mesh 61 and the second mesh 62. However, skin tones and eye, nose, and mouth shapes of the first avatar 71 and the second avatar 72 obtained based on the same smoothing texture 55 may be the same.

In an embodiment, the electronic device may obtain the first and second avatars 71 and 72 by using a UV mapping method, that is, a method of projecting the smoothing texture 55, which is a 2D image, onto surfaces of the first and second 3D meshes 61 and 62.

An electronic device for providing an avatar according to an embodiment of the disclosure may include memory and at least one processor. The memory may include at least one instruction. The at least one processor may execute the at least one instruction. The at least one processor may obtain a plurality of raw textures by matching a 3D shape related to a user face to a 2D plane. The at least one processor may perform tone-matching for smoothing each of skin tones of the plurality of raw textures based on an average of the skin tones of the plurality of raw textures. The at least one processor may obtain a plurality of texture segments by splitting at least one of a plurality of tone-matched raw textures for each feature area in a face. The at least one processor may obtain a combined texture by combining a plurality of texture segments selected for each specific area by a user input from among the obtained plurality of texture segments. The at least one processor may obtain an avatar representing the user face in a 3D shape, by mapping the combined texture.

In an embodiment, the at least one processor may obtain a 2D image of the user face. The at least one processor may obtain a cartoon image by cartoonizing the 2D image. The at least one processor may obtain a 3D shape image corresponding to the user face, based on the obtained cartoon image. The at least one processor may obtain a plurality of raw textures corresponding to the user face, by unwrapping the 3D shape image and matching the unwrapped 3D shape image to a 2D plane.

In an embodiment, the 2D image may be an image of a front surface of the user face including two eyes, a nose, and a mouth.

In an embodiment, the at least one processor may obtain an average skin tone segment based on skin tones of the plurality of raw textures. The at least one processor may obtain first frequency information about frequencies of colors included in the average skin tone segment. The at least one processor may obtain second frequency information about frequencies of skin tone colors included in the plurality of raw textures. The at least one processor may perform tone-matching based on the first frequency information and the second frequency information.

In an embodiment, the at least one processor may tone-match the plurality of raw textures by using a histogram matching algorithm, based on the average skin tone segment.

In an embodiment, the memory may include a segment database in which the plurality of texture segments are stored for each feature area. The at least one processor may store texture segments in the segment database for each feature area. The at least one processor may obtain a combined texture by combining a plurality of texture segments selected for each feature area by a user input.

In an embodiment, the feature area may include at least one of a skin area, an eye area, a nose area, and a mouth area of the user face.

In an embodiment, the plurality of texture segments may include a plurality of first texture segments related to a first user face and a plurality of second texture segments related to a second user face. The at least one processor may obtain a combined texture, by combining at least one first texture segment from among the plurality of first texture segments and at least one second texture segment from among the plurality of second texture segments, selected by a user input.

In an embodiment, the at least one processor may obtain a smoothing texture by smoothing a skin tone between two adjacent texture segments from among the plurality of texture segments in the combined texture. The at least one processor may obtain an avatar representing the user face in a 3D shape based on the smoothing texture.

In an embodiment, the at least one processor may smooth a boundary between two adjacent texture segments in the combined texture. The at least one processor may harmonize a skin tone between two adjacent texture segments in the combined texture.

In an embodiment, the at least one processor may obtain a 3D mesh related to a facial skeleton. The at least one processor may obtain an avatar by mapping the combined texture to the 3D mesh.

A method of providing an avatar according to an embodiment of the disclosure may include obtaining a plurality of raw textures by matching a 3D shape related to a user face to a 2D plane. The method may include performing tone-matching for smoothing each of skin tones of the plurality of raw textures based on an average of the skin tones of the plurality of raw textures. The method may include obtaining a plurality of texture segments by splitting at least one of a plurality of tone-matched raw textures for each feature area in a face. The method may include obtaining a combined texture by combining a plurality of texture segments selected for each feature area by a user input from among the obtained plurality of texture segments. The method may include obtaining an avatar representing the user face in a 3D shape, by mapping the combined texture.

In an embodiment, the obtaining of the plurality of raw textures may include obtaining a 2D image of the user face. The obtaining of the plurality of raw textures may include obtaining a cartoon image by cartoonizing the 2D image. The obtaining of the plurality of raw textures may include obtaining a 3D shape image corresponding to the user face, based on the obtained cartoon image. The method may include obtaining a plurality of raw textures corresponding to the user face, by unwrapping the 3D shape image and matching the unwrapped 3D shape image to a 2D plane.

In an embodiment, the performing of the tone-matching may include obtaining an average skin tone segment, based on skin tones of the plurality of raw textures. The performing of the tone-matching may include obtaining first frequency information about frequencies of colors included in the average skin tone segment. The performing of the tone-matching may include obtaining second frequency information about frequencies of skin tone colors included in the plurality of raw textures. The performing of the tone-matching may include performing the tone-matching based on the first frequency information and the second frequency information.

In an embodiment, the obtaining of the combined texture may include storing texture segments in a segment database for each feature area. The obtaining of the combined texture may include obtaining the combined texture by combining a plurality of texture segments selected for each feature area by a user input.

In an embodiment, the feature area may include at least one of a skin area, an eye area, a nose area, and a mouth area of the user face.

In an embodiment, the plurality of texture segments may include a plurality of first texture segments related to a first user face and a plurality of second texture segments related to a second user face. In an embodiment, the obtaining of the combined texture may include obtaining the combined texture, by combining at least one first texture segment from among the plurality of first texture segments and at least one second texture segment from among the plurality of second texture segments, selected by a user input.

In an embodiment, the method of providing an avatar may further include obtaining a smoothing texture by smoothing a skin tone between two adjacent texture segments from among the plurality of texture segments in the combined texture. The method may further include obtaining an avatar representing the user face in a 3D shape based on the smoothing texture.

In an embodiment, the smoothing may include smoothing a boundary between two adjacent texture segments in the combined texture. The smoothing may include harmonizing a skin tone between two adjacent texture segments in the combined texture.

A computer-readable recording medium having recorded thereon at least one program for performing a method of providing an avatar according to an embodiment of the disclosure may be provided.

A machine-readable storage medium may be provided as a non-transitory storage medium. Here, 'non-transitory' means that the storage medium does not include a signal (e.g., an electromagnetic wave) and is tangible, but does not distinguish whether data is stored semi-permanently or temporarily in the storage medium. For example, the 'non-transitory storage medium' includes a buffer in which data is temporarily stored.

According to an embodiment, methods according to various embodiments of the disclosure may be provided in a computer program product. The computer program product may be a product purchasable between a seller and a purchaser. The computer program product may be distributed in the form of a machine-readable storage medium (e.g., compact disc read-only memory (CD-ROM)), or distributed (e.g., downloaded or uploaded) online via an application store or between two user devices (e.g., smartphones) directly. When distributed online, at least part of the computer program product (e.g., a downloadable application) may be temporarily generated or at least temporarily stored in a machine-readable storage medium, such as memory of a server of a manufacturer, a server of an application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device for providing an avatar, the electronic device comprising:
- memory storing one or more computer programs; and
- one or more processors communicatively coupled to the memory,
- wherein the one or more computer programs include computer-executable instructions that, when executed by the one or more processors individually or collectively, cause the electronic device to:
  - obtain a plurality of raw textures by matching a three-dimensional (3D) shape related to a user face to a two-dimensional (2D) plane,
  - perform tone-matching for smoothing each of skin tones of the plurality of raw textures based on an average of the skin tones of the plurality of raw textures,
  - obtain a plurality of texture segments by splitting at least one of a plurality of tone-matched raw textures for each feature area in a face,
  - obtain a combined texture by combining a plurality of texture segments selected for each specific area by a user input from among the obtained plurality of texture segments, and
  - obtain the avatar representing the user face in a 3D shape, by mapping the combined texture.

2. The electronic device of claim 1, wherein the one or more computer programs further include computer-executable instructions that, when executed by the one or more processors individually or collectively, cause the electronic device to:
- obtain a 2D image of the user face;
- obtain a cartoon image by cartoonizing the 2D image;
- obtain a 3D shape image corresponding to the user face, based on the obtained cartoon image; and
- obtain the plurality of raw textures corresponding to the user face, by unwrapping the 3D shape image and matching the unwrapped 3D shape image to a 2D plane.

3. The electronic device of claim 2, wherein the 2D image is an image of a front surface of the user face comprising two eyes, a nose, and a mouth.

4. The electronic device of claim 3, wherein the one or more computer programs further include computer-executable instructions that, when executed by the one or more processors individually or collectively, cause the electronic device to:
- obtain an average skin tone segment based on the skin tones of the plurality of raw textures;
- obtain first frequency information about frequencies of colors included in the average skin tone segment;
- obtain second frequency information about frequencies of skin tone colors included in the plurality of raw textures; and
- perform the tone-matching based on the first frequency information and the second frequency information.

5. The electronic device of claim 4,
- wherein the memory comprises a segment database in which the plurality of texture segments are stored for each feature area, and
- wherein the one or more computer programs further include computer-executable instructions that, when executed by the one or more processors individually or collectively, cause the electronic device to:
  - store the plurality of texture segments in the segment database for each feature area, and
  - obtain the combined texture by combining the plurality of texture segments selected for each feature area by the user input.

6. The electronic device of claim 5,
- wherein the plurality of texture segments comprise a plurality of first texture segments related to a first user face and a plurality of second texture segments related to a second user face, and wherein the one or more computer programs further include computer-executable instructions that, when executed by the one or more processors individually or collectively, cause the electronic device to obtain the combined texture, by combining at least one first texture segment from among the plurality of first texture segments and at least one second texture segment from among the plurality of second texture segments, selected by the user input.

7. The electronic device of claim 6, wherein the one or more computer programs further include computer-executable instructions that, when executed by the one or more processors individually or collectively, cause the electronic device to:

obtain a smoothing texture by smoothing a skin tone between two adjacent texture segments from among the plurality of texture segments in the combined texture; and obtain the avatar representing the user face in a 3D shape based on the smoothing texture.

8. The electronic device of claim 7, wherein the one or more computer programs further include computer-executable instructions that, when executed by the one or more processors individually or collectively, cause the electronic device to:

smooth a boundary between the two adjacent texture segments in the combined texture; and harmonize a skin tone between the two adjacent texture segments in the combined texture.

9. The electronic device of claim 8, wherein the one or more computer programs further include computer-executable instructions that, when executed by the one or more processors individually or collectively, cause the electronic device to:

obtain a 3D mesh related to a facial skeleton; and obtain the avatar by mapping the combined texture to the 3D mesh.

10. A method performed by an electronic device of providing an avatar, the method comprising:

obtaining, by the electronic device, a plurality of raw textures by matching a three-dimensional (3D) shape related to a user face to a two-dimensional (2D) plane;

performing, by the electronic device, tone-matching for smoothing each of skin tones of the plurality of raw textures based on an average of the skin tones of the plurality of raw textures;

obtaining, by the electronic device, a plurality of texture segments by splitting at least one of a plurality of tone-matched raw textures for each feature area in a face;

obtaining, by the electronic device, a combined texture by combining a plurality of texture segments selected for each specific area by a user input from among the obtained plurality of texture segments; and obtaining, by the electronic device, the avatar representing the user face in a 3D shape, by mapping the combined texture.

11. The method of claim 10, wherein the performing of the tone-matching comprises:

obtaining an average skin tone segment based on the skin tones of the plurality of raw textures;

obtaining first frequency information about frequencies of colors included in the average skin tone segment;

obtaining second frequency information about frequencies of skin tone colors included in the plurality of raw textures; and performing the tone-matching based on the first frequency information and the second frequency information.

12. The method of claim 11, wherein the obtaining of the combined texture comprises:

storing the plurality of texture segments in a segment database for each feature area; and obtaining the combined texture by combining the plurality of texture segments selected for each feature area by the user input.

13. The method of claim 12, wherein the plurality of texture segments comprise a plurality of first texture segments related to a first user face and a plurality of second texture segments related to a second user face, and wherein the obtaining of the combined texture comprises obtaining the combined texture, by combining at least one of the plurality of first texture segments and at least one of the plurality of second texture segments, selected by the user input.

14. The method of claim 13, further comprising:

obtaining a smoothing texture by smoothing a skin tone between two adjacent texture segments from among the plurality of texture segments in the combined texture; and obtaining the avatar representing the user face in a 3D shape based on the smoothing texture.

15. One or more non-transitory computer-readable recording media storing one or more computer programs including computer-executable instructions that, when executed by one or more processors of an electronic device individually or collectively, cause the electronic device to perform operations, the operations comprising:

obtaining, by the electronic device, a plurality of raw textures by matching a three-dimensional (3D) shape related to a user face to a two-dimensional (2D) plane;

performing, by the electronic device, tone-matching for smoothing each of skin tones of the plurality of raw textures based on an average of the skin tones of the plurality of raw textures;

obtaining, by the electronic device, a plurality of texture segments by splitting at least one of a plurality of tone-matched raw textures for each feature area in a face;

obtaining, by the electronic device, a combined texture by combining a plurality of texture segments selected for each specific area by a user input from among the obtained plurality of texture segments; and obtaining, by the electronic device, an avatar representing the user face in a 3D shape, by mapping the combined texture.

16. The one or more non-transitory computer-readable storage media of claim 15, wherein the performing of the tone-matching comprises:

obtaining an average skin tone segment based on the skin tones of the plurality of raw textures;

obtaining first frequency information about frequencies of colors included in the average skin tone segment;

obtaining second frequency information about frequencies of skin tone colors included in the plurality of raw textures; and performing the tone-matching based on the first frequency information and the second frequency information.

17. The one or more non-transitory computer-readable storage media of claim 15, wherein the obtaining of the combined texture comprises:

storing the plurality of texture segments in a segment database for each feature area; and obtaining the combined texture by combining the plurality of texture segments selected for each feature area by the user input.

18. The one or more non-transitory computer-readable storage media of claim 16, wherein the plurality of texture segments comprise a plurality of first texture segments related to a first user face and a plurality of second texture segments related to a second user face, and wherein the obtaining of the combined texture comprises obtaining the combined texture, by combining at least one of the plurality of first texture segments and at least one of the plurality of second texture segments, selected by the user input.

19. The one or more non-transitory computer-readable storage media of claim 17, further comprising:

obtaining a smoothing texture by smoothing a skin tone between two adjacent texture segments from among the plurality of texture segments in the combined texture;

and obtaining the avatar representing the user face in a 3D shape based on the smoothing texture.

* * * * *